United States Patent
Zhang et al.

(10) Patent No.: US 11,569,933 B2
(45) Date of Patent: Jan. 31, 2023

(54) METHOD AND APPARATUS FOR DETECTING PHYSICAL DOWNLINK CONTROL CHANNEL BASED ON PREDICTED INFORMATION

(71) Applicant: SAMSUNG ELECTRONICS CO., LTD., Suwon-si (KR)

(72) Inventors: Ranran Zhang, Beijing (CN); Guangyu Sun, Beijing (CN); Zhigang Wang, Beijing (CN); Jiangbo Guo, Beijing (CN); Xiaohui Yang, Beijing (CN); Yi Zhao, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 17/078,506

(22) Filed: Oct. 23, 2020

(65) Prior Publication Data

US 2021/0126737 A1 Apr. 29, 2021

(30) Foreign Application Priority Data

Oct. 25, 2019 (CN) .......................... 201911025285.3

(51) Int. Cl.
*H04L 1/00* (2006.01)
*H04W 8/24* (2009.01)
(Continued)

(52) U.S. Cl.
CPC ............. *H04L 1/0038* (2013.01); *H04W 8/24* (2013.01); *H04W 72/042* (2013.01); *H04W 76/27* (2018.02); *H04W 76/28* (2018.02)

(58) Field of Classification Search
CPC ...... H04L 1/0038; H04L 5/0094; H04W 8/24; H04W 72/042; H04W 76/27; H04W 76/28; H04W 52/0212; H04W 52/0216
See application file for complete search history.

(56) References Cited

U.S. PATENT DOCUMENTS 9,281,920 B2  3/2016  Matsumoto
10,200,173 B2  2/2019  Guan et al.
(Continued)

FOREIGN PATENT DOCUMENTS

CN  110289936 A  9/2019
EP  2 901 590 B1  5/2019
(Continued)

OTHER PUBLICATIONS

Zhang et al., Optimization of PDCCH blind detection method in LTE-A System, IOP Conf. Series: Materials Science and Engineering 490, Issue 7, Apr. 15, 2019. (Year: 2019).*

(Continued)

*Primary Examiner* — Shailendra Kumar
(74) *Attorney, Agent, or Firm* — Sughrue Mion, PLLC

(57) ABSTRACT

A method performed by a terminal in a wireless communication system, including receiving, from a base station, a physical downlink control channel (PDCCH); predicting aggregation level information including information about an aggregation level of a control channel element (CCE) in which the PDCCH is received based on an aggregation level prediction model; determining a detection order for detecting the PDCCH based on the aggregation level information; and etecting the PDCCH based on the determined detection order.

16 Claims, 19 Drawing Sheets

(51) Int. Cl.
*H04W 72/04* (2009.01)
*H04W 76/27* (2018.01)
*H04W 76/28* (2018.01)

(56) References Cited

U.S. PATENT DOCUMENTS

| | | | |
|---|---|---|---|
| 2013/0142142 A1* | 6/2013 | McBeath | H04W 72/042 |
| | | | 370/329 |
| 2017/0006584 A1 | 1/2017 | Ren et al. | |
| 2019/0082422 A1* | 3/2019 | Sun | H04L 5/0053 |
| 2019/0166589 A1 | 5/2019 | Yang et al. | |
| 2019/0297577 A1 | 9/2019 | Lin et al. | |
| 2020/0068540 A1* | 2/2020 | Wang | H04W 80/08 |
| 2020/0404630 A1* | 12/2020 | Gustafsson | H04L 1/1896 |
| 2021/0321446 A1* | 10/2021 | Lee | H04L 5/0044 |

FOREIGN PATENT DOCUMENTS

| | | | | |
|---|---|---|---|---|
| EP | 3589064 A1 * | 1/2020 | | H04W 76/00 |
| WO | WO-2018202167 A1 * | 11/2018 | | H03M 13/2778 |
| WO | WO-2021035589 A1 * | 3/2021 | | |

OTHER PUBLICATIONS

Technical Report 3rd Generation Partnership Project; Technical Specification Group Radio Access Network; NR; Study on UE PowerSaving (Release 16), 3GPP TR 38.840, V1.0.0, Mar. 2019 (70 pages total).

"Study on UE Power Saving in NR", CATT, CMCC, vivo, CATR, Qualcomm, MediaTek, 3GPP TSG RAN Meetings #80, La Jolla, USA, Jun. 11-14, 2018, RP-181463, (5 pages total).

Bo Zhang et al., "Optimization of PDCCH blind detection method in LTE-A system", IOP Conference Series: Materials Science and Engineering, vol. 490, Issue 7, Apr. 15, 2019, 9 pages total.

International Search Report and Written Opinion dated Jan. 26, 2021 by the International Searching Authority in counterpart International Patent Application No. PCT/KR2020/013791 (PCT/ISA/220, PCT/ISA/210, and PCT/ISA/237).

Communication dated Oct. 10, 2022, issued by the European Patent Office in counterpart European Application No. 20879489.1.

* cited by examiner

METHOD AND APPARATUS FOR DETECTING PHYSICAL DOWNLINK CONTROL CHANNEL BASED ON PREDICTED INFORMATION

CROSS-REFERENCE TO RELATED APPLICATIONS

This application is based on and claims priority under 35 U.S.C. § 119(a) to Chinese Application Number 201911025285.3 filed on Oct. 25, 2019 in the China National Intellectual Property Administration, the disclosure of which is incorporated by reference herein in its entirety.

BACKGROUND

1. Field

The disclosure relates to a wireless communication technology, and more particularly to a detection method of a physical downlink control channel (PDCCH) and a configuration method of a discontinuous reception (DRX).

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system may also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which may be a human-centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Provided is a method performed by a terminal in a wireless communication system is provided.

Additional aspects will be set forth in part in the description which follows and, in part, will be apparent from the description, or may be learned by practice of the presented embodiments.

In accordance with an aspect of the disclosure, a method performed by a terminal in a wireless communication system includes receiving, from a base station, a physical downlink control channel (PDCCH); predicting aggregation level information including information about an aggregation level of a control channel element (CCE) in which the PDCCH is received based on an aggregation level prediction model; determining a detection order for detecting the PDCCH based on the aggregation level information; and etecting the PDCCH based on the determined detection order.

The method may further include obtaining input data for predicting the aggregation level information; and predicting the aggregation level information by using the aggregation level prediction model based on the input data; and the input data may be related to reporting data transmitted to the base station for determining the aggregation level of the CCE.

The input data may include at least one of a reference signal receiving power (RSRP), a channel quality indicator (CQI), a signal-to-noise ratio (SNR), a downlink control information (DCI) payload, or a PDCCH slot index.

The predicting of the aggregation level information based on the aggregation level prediction model may include determining a probability of detecting the PDCCH for each one of a plurality of aggregation levels; and the determining of the detection order for detecting PDCCH based on the aggregation level information may include determining the detection order based on the probability for the each one of the plurality of aggregation levels.

The detection order may be determined to first detect a CCE corresponding to an aggregation level having a largest probability value from among the plurality of aggregation levels.

The method may further include obtaining a cell identifier of a cell to which the terminal is connected; and identifying the aggregation level prediction model based on the cell identifier.

The cell identifier may include a new radio cell global identity (NCGI), and the NCGI may include at least one of a mobile country code (MCC), a mobile network code (MNC), or a next generation node (gNB) identification.

The method may further include determining a prediction accuracy of the aggregation level prediction model; and predicting the aggregation level information based on the aggregation level prediction model, based on the prediction accuracy being equal to or greater than a preset value.

The method may further include obtaining the aggregation level prediction model from server; and updating the aggregation level prediction model based on reporting data which is transmitted to the base station for deciding the aggregation level of the CCE, and result data corresponding to the detecting of the PDCCH.

The method may further include reporting, to the base station, PDCCH detection capability information indicating whether the terminal has detected the PDCCH according to the determined detection order; receiving, from the base station, information about a discontinuous reception (DRX) cycle which is determined based on the PDCCH detection capability information; and detecting the PDCCH according to the information about the DRX cycle.

The DRX cycle of the terminal may be shorter than a DRX cycle of another terminal which detects the PDCCH based on blind detection.

The PDCCH detection capability information may be transmitted using a radio resource control (RRC) signaling.

In accordance with an aspect of the disclosure, a method performed by a base station in a wireless communication system, the method includes receiving, from a terminal, reporting data for determining an aggregation level of control channel element (CCE); and transmitting, to the terminal, a physical downlink control channel (PDCCH) based on the reporting data.

The method may further include receiving, from the terminal, PDCCH detection capability information indicating whether the terminal has detected the PDCCH according to a determined detection order; determining information about a discontinuous reception (DRX) cycle based on the PDCCH detection capability information; and transmitting, to the terminal, the information about the DRX cycle; and the DRX cycle of the terminal may be shorter than a DRX cycle of another terminal which detects the DCI based on blind detection.

In accordance with an aspect of the disclosure, a terminal of a wireless communication system includes a transceiver; and at least one processor coupled with the transceiver and configured to: receive, from a base station, a physical downlink control channel (PDCCH), predict aggregation level information including information about an aggregation level of a control channel element (CCE) in which the PDCCH is received based on an aggregation level prediction model, determine a detection order for detecting the PDCCH based on the aggregation level information, and detect the PDCCH based on the determined detection order.

The at least one processor may be further configured to: obtain input data for predicting the aggregation level information, and predict the aggregation level information by using the aggregation level prediction model based on the input data, and the input data may be related to a reporting data transmitted to the base station for determining the aggregation level of the CCE.

The at least one processor may be further configured to: determine a probability of detecting the PDCCH for each one of a plurality of aggregation levels, and determine the detection order based on the probability for the one of the plurality of aggregation levels.

The at least one processor may be further configured to: obtain a cell identifier of a cell to which the terminal is connected; and identify the aggregation level prediction model based on the cell identifier.

The at least one processor may be further configured to: determine a prediction accuracy of the aggregation level prediction model; and predict the aggregation level information based on the aggregation level prediction model, based on the prediction accuracy being equal to or greater than a preset value.

The at least one processor may be further configured to: report, to the base station, PDCCH detection capability information indicating whether the terminal has detected the PDCCH according to the determined detection order; receive, from the base station, information about a discontinuous reception (DRX) cycle which is determined based on the PDCCH detection capability information; and detect the PDCCH according to the information about the DRX cycle.

BRIEF DESCRIPTION OF THE DRAWINGS

The above and other purposes and features of the exemplary embodiments of the present disclosure will become clearer, from the descriptions in combination with the accompanying drawings below, which exemplarily illustrate the embodiments, and in which.

DETAILED DESCRIPTION

Figure 1:
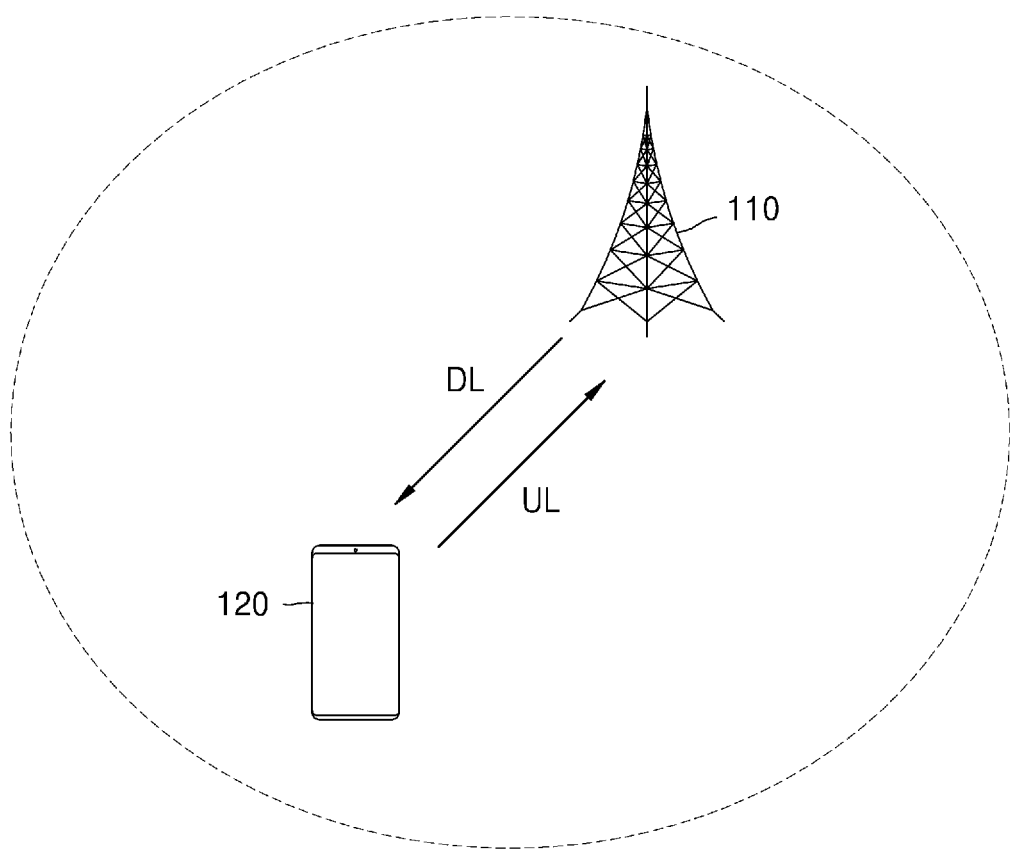
FIG. 1 schematically illustrates a wireless communication system according to an embodiment.

Embodiments of the present disclosure, an example of which is illustrated in the accompany drawings will now be referred to in detail, wherein the same reference numeral generally indicate the same part throughout the accompany drawings. The embodiments will be illustrated below with reference to the accompanying drawings, so as to explain the present disclosure.

Throughout the present disclosure, the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

FIG. 1 schematically illustrates a wireless communication system according to an exemplary embodiment of the present disclosure.

The wireless communication system may include base station (BS) 110 and terminal 120. The base station 110 may refer to an enhanced base station (eNodeB or eNB) or a 5G base station (gNB). The terminal 120 may refer to user equipment (UE).

The wireless communication system may further include a server. As an example, the server may an apparatus separate from the terminal 120 or base station 110. As another example, the server may be included in the base station 110 or the terminal 120.

In exemplary embodiments of the present disclosure, the base station 110, the terminal 120, and the server may support at least one of the 3G protocol, the 4G protocol and the 5G protocol, respectively, and certainly, these are not used for limitation, for example, the possibility of supporting a next generation protocol or old protocols is not excluded.

In a long term evolution (LTE) or new radio (NR) system, a physical downlink control channel (PDCCH) carries control information that may include, but is not limited to: a transmit format, resource allocation information, uplink scheduling permission, power control information, and uplink retransmit information. According to a link direction, the control information carried by the PDCCH may include uplink control information and downlink control information (DCI). According to an action scope, for example a search space which defines a start position of a blind detection and a channel search scheme, the control information carried by the PDCCH may include common control information and dedicated control information.

While performing communication, the terminal 120 may perform a PDCCH detection. However, there is a technical problem in the related art that the PDCCH detection may be performed a large number of times, resulting in a long time spent for the PDCCH detection and large power consumption of the terminal. The DCI may include DCI format for physical uplink shared channel (PUSCH) and DCI format for physical downlink shared channel (PDSCH) DCI. A radio network temporary identity (RNTI) may be used to identify or detect the PDCCH, for example, a cyclic redundancy check (CRC) of the DCI may be scrambled through the RNTI to identify the DCI.

In general, there may be a plurality of PDCCHs in a transmission time interval (TTI). The terminal 120 may need to demodulate the DCI in the PDCCH, and then demodulate the PDSCHs belonging to the terminal 120. For example, the PDSCH may include, but are not limited to: a broadcast message, paging, and UE data.

A plurality of PDCCHs may be simultaneously transmitted in a PDCCH transmission bandwidth. In order to configure the PDCCH and time-frequency resources other than the PDCCH more effectively, a long term evolution (LTE) protocol and a new radio (NR) protocol define a control channel element (CCE). A downlink channel environment in which the terminal 120 is located may affect the number of the CCEs occupied by the PDCCH. The base station 110 may allocate fewer CCEs to the terminal 120 in a better downlink channel environment, and allocate more CCEs to the terminal 120 in a poor downlink channel environment. For example, the base station 110 may allocate one CCE to transmit the PDCCH the terminal 120 which is located in the better downlink channel environment, whereas the base station 110 may allocate 16 CCEs to transmit the PDCCH the terminal 120 which is located in the poor downlink channel environment. The amount of CCEs contained or occupied by the PDCCH may be referred to as an aggregation level (AL). In order to simplify complexity of a PDCCH detection, the LTE and NR protocols further specify that the CCE number corresponding to an initial position of the PDCCH is an integer multiple of the aggregation level.

In LTE and NR networks, the base station 110 may transmit the PDCCH to the terminal 120, but the base station 110 does not notify the terminal 120 of the aggregation level of the PDCCH and the CCE number corresponding to the initial position of the PDCCH. The terminal 120 needs to perform the PDCCH detection with respect to a plurality of aggregation levels, and such a detection may be referred to as a blind detection. When the aggregation level is determined by the blind detection, the CCEs transmitting the PDCCH may be determined.

According to third generation partnerships project (3GPP) standardization research and terminal development results, the increase of PDCCH detection may increase the terminal power consumption.

On one hand, in one TTI, the terminal 120 detects the PDCCH according to a configured discontinuous reception (DRX) cycle until one of the following two results is reached: (a) under one result, the terminal 120 detects the PDCCH, receives the DCI carried by the PDCCH, and stops the PDCCH detection; or (b) under the other result, if the terminal 120 does not detect the PDCCH before reaching a defined maximum number of PDCCH detections with respect to a search space, the terminal 120 ends the PDCCH detection.

In a process of performing the PDCCH detection, the terminal 120 may perform channel decoding with respect to a candidate PDCCH corresponding to each of the plurality of aggregation levels. Completing the channel decoding process consumes operands, and the increase in the number of channel decoding times may result in an increase in the number of consumed operands. Therefore, as the number of the aggregation levels to which the detection is performed increases, the number of channel decoding times may increase, and the number of consumed operands may also increase, thereby resulting in an increase in the power consumption.

In a traditional PDCCH detection process, the blind detection may be performed according to a fixed or a predetermined aggregation level order. For example, when the terminal 120 may start the blind detection, the terminal 120 may use an AL of a size of 1 as an initial aggregation level according to the predetermined aggregation level order. After that, the terminal 120 may increase the value of the aggregation level gradually according to the predetermined aggregation level order to detect the PDCCH corresponding to a specific aggregation level until the PDCCH is detected or the value of the aggregation level is reaches the largest value. For example, the terminal 120 may perform the blind detection according to limited prior information. The terminal 120 may use the value of the aggregation level at the end of the last blind detection as the initial aggregation level to start the current blind detection. After that, the terminal 120 may increase the value of aggregation level according to the predetermined aggregation level order to attempt to detect the PDCCH corresponding to the specific aggregation level.

As mentioned above, during the traditional PDCCH detection process, the prior information is not used or only the limited prior information is used. Therefore, the terminal 120 needs to determine the aggregation level of the PDCCH through several attempts to detect the PDCCH, so the conventional PDCCH detection is referred to as the blind detection. The blind detection generally cannot directly perform the PDCCH detection with respect to an actual aggregation level (i.e. the aggregation level of the current PDCCH), and the attempts before finding the actual aggregation level may consume the power of the terminal 120.

Third generation (3G), fourth generation (4G) and fifth generation (5G) systems need to consider the problem of terminal power consumption. A 5G protocol takes energy efficiency as a key performance indicator, and thus a power consumption condition of the terminal may be considered more during the design process.

On the other hand, in order to reduce the terminal power consumption, a 5G standard may change the DRX and the like. For example, an opportunity of the terminal 120 to detect the PDCCH may be reduced by increasing the DRX cycle, for example the number of TTIs in which the PDCCH detection is performed. That is, the number of times of the PDCCH detections may be reduced. A reduction in the detection opportunity of the PDCCH may result in a reduction in an opportunity of the terminal 120 to be scheduled, such that the time delay of the terminal 120 increases. In addition, the blind detection of the PDCCH often needs multiple rounds of detections, and during the detection process of the PDCCH, signals for assisting scheduling and measurement for example, a sounding reference signal (SRS), cannot be transmitted either. The 5G core technology includes a massive multi-input multi-output (Massive MIMO) technology. The Massive MIMO technology needs to use the SRS to perform a channel measurement, and thus the non-transmission of the SRS during the detection process of the PDCCH may affect the performance of the Massive MIMO.

According to exemplary embodiments of the present disclosure, a method of detecting physical downlink control channel based on predicted information is provided. Examples of this are described in detail below according to embodiments.

In exemplary embodiments, the terminal 120 may perform the PDCCH detection based on an aggregation level prediction model (AL prediction model). For example, AL related information may be predicted by using the prior information embodied by the AL prediction model, for example an AL order in which the PDCCH detection is performed. The PDCCH detection may be performed according to the predicted AL related information. The AL prediction model performed by the terminal 120 or the server may be described in FIG. 3.

In exemplary embodiments, the base station 110 may calculate the aggregation level of the PDCCH according to link information, for example link quality information or channel quality information between the base station 110 and the terminal 120 is applied to a PDCCH AL adaptive algorithm to calculate the aggregation level of the PDCCH. The PDCCH AL adaptive algorithm performed by the base station 110 may be described in FIG. 2.

In exemplary embodiments, the terminal 120 may use the historical data (which may be referred to as training data) to learn the scheme in which the base station 110 calculates aggregation level, so as to form the AL prediction model. For example, the historical data may include data used by the base station 110 while performing the PDCCH AL adaptive algorithm (which may be referred to as PDCCH AL adaptive algorithm parameters) and the aggregation levels of the PDCCH that have been detected by the terminal 120.

In exemplary embodiments, an aggregation level order in which the detection is performed may be determined according to the information predicted by the AL prediction model, and the PDCCH detection is performed according to the aggregation level order rather than the blind detection.

According to the present disclosure, the number PDCCH detections in the PDCCH detection process may be reduced to reduce the power consumption. Also, more opportunities for the transmission of information such as the SRS and the like may be provided to improve performance such as a response speed of the terminal 120 and the like.

In exemplary embodiments, the base station 110 may configure parameters such as the DRX and the like according to whether the terminal 120 may perform the PDCCH detection based on the AL prediction model, to ensure the transmission of the signals such as the SRS and the like and to ensure that the scheduling based on the PDCCH may be performed. According to the present disclosure, the throughput may be improved and the time delay may be reduced.

According to another exemplary embodiment of the present disclosure, a computer-readable storage medium storing an instruction is provided, wherein when the instruction is executed by at least one computing device, the at least one computing device is enabled to perform one or more methods described herein.

The present disclosure may effectively use prior information to reduce the number of detection times of the PDCCH during a PDCCH detection process to achieve a purpose of saving terminal power consumption.

In addition, if the terminal may complete the PDCCH detection with less power consumption, a shorter DRX duration or cycle may be set for the terminal. The terminal may perform the detection based on the predicted information to complete the PDCCH detection in a time shorter than that of the PDCCH blind detection, so that less terminal power may be consumed, and a long non-DRX cycle may increase an opportunity of the terminal to be scheduled, so as to improve transmission efficiency, for example improving the amount of received and transmitted data of a massive Multi-Input Multi-Output (MIMO).

Figure 2:
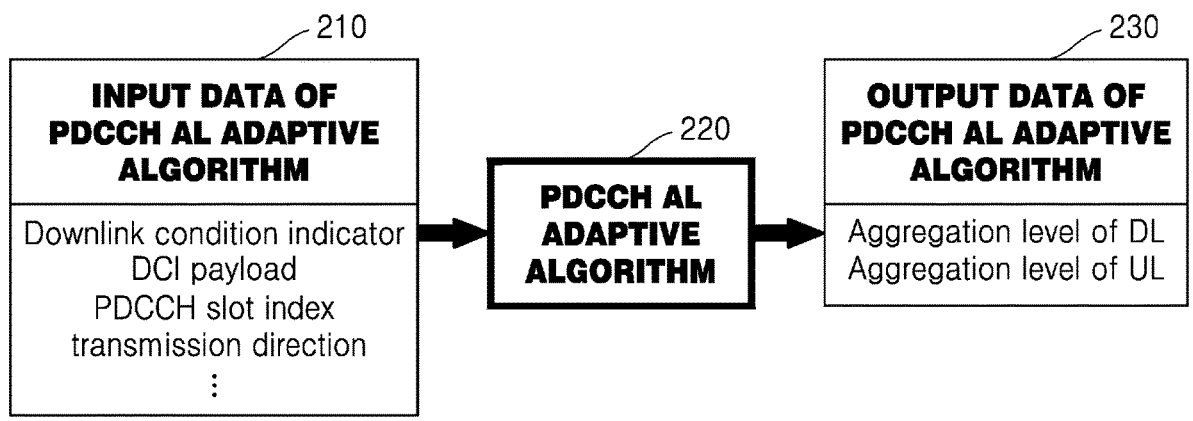
FIG. 2 illustrates a schematic diagram of an algorithm for a base station to determine an aggregation level according to an exemplary embodiment.

FIG. 2 illustrates a schematic diagram of an algorithm for a base station to determine an aggregation level according to an exemplary embodiment of the present disclosure.

In the present disclosure, PDCCH AL adaptive algorithm may mean an algorithm for determining an aggregation level by a base station 110. For example, the base station 110 may determine an aggregation level for transmitting the PDCCH to the terminal 120 according to the PDCCH AL adaptation algorithm.

As shown in FIG. 2, the terminal 120 may report the input data of the PDCCH AL adaptive algorithm 210 to the base station 110.

In the present disclosure, the input data of PDCCH AL adaptive algorithm 210 may mean parameters reported by the terminal 120, and the base station 110 may determine the aggregation level of PDCCH for the terminal reporting the parameters based on the input data of PDCCH AL adaptive algorithm 210. For example, the input data of PDCCH AL adaptive algorithm 210 may include the link information, and the link information may include link quality information and channel quality information between the base station 110, for example a next generation node (gNB) and the terminal 120, and the like.

For example, the input data 210 of PDCCH AL adaptive algorithm may include at least one of downlink condition indicators of the terminal, information of the DCI payload, for example a bit size of DCI, a PDCCH slot index, or information of a transmission direction.

For example, the downlink condition indicators of the terminal may include at least one of reference signal receiving power (RSRP), a channel quality indicator (CQI) or a signal-to-noise ratio (SNR). However, the downlink condition indicators of the terminal are not limited to the above-described example and may include any information indicating an environment in which the terminal receives the downlink from the base station.

For example, the transmission direction may include at least one of the downlink (DL) and the uplink (UL).

The base station 110 may determine output data 230 of the PDCCH AL adaptive algorithm 220 using the PDCCH AL adaptive algorithm 220 based on the input data 210. For example, the output data 230 of the PDCCH AL adaptive algorithm 220 may include at least one of the aggregation level related information of the downlink or the aggregation level related information of the uplink.

Figure 3:
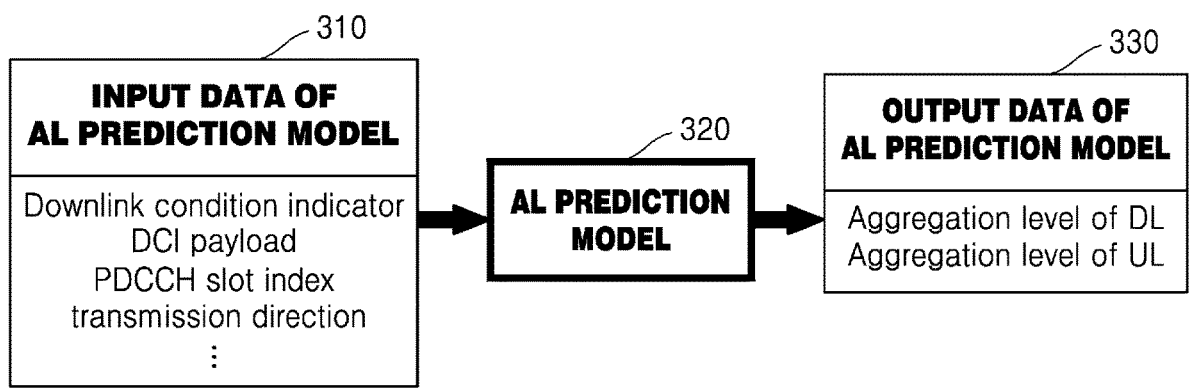
FIG. 3 illustrates a schematic diagram of an algorithm of predicting aggregation level related information of a PDCCH based on an AL prediction model according to an exemplary embodiment.

FIG. 3 illustrates a schematic diagram of an algorithm of predicting aggregation level related information of a PDCCH based on an AL prediction model according to an exemplary embodiment of the present disclosure.

Referring to FIG. 2, at a network side, the base station 110 may determine the channel quality of the PDCCH according to the parameters reported by the terminal 120 (or a user), and determine the aggregation level of the PDCCH.

In exemplary embodiments, the terminal 120 may know the input data 210 to use for the PDCCH AL adaptive algorithm 220 because the input data 210, for example the link information is reported by the terminal 120. Also, the terminal 120 may know or predict output data 230 of the PDCCH AL adaptive algorithm 220 performed by the base station 110 if the terminal 120 may learn the PDCCH AL adaptive algorithm. For example, through the PDCCH detection, the terminal 120 may know the aggregation level of the PDCCH that is, the aggregation level calculated and configured according to the PDCCH AL adaptive algorithm. For example, the aggregation level may include at least one of the aggregation level of the uplink and the aggregation level of the downlink. According to the present disclosure, the purpose of avoiding the blind detection may be achieved. Also, according to the present disclosure, a possibility is provided for the terminal 120 or devices other than the terminal, for example the server, to learn the PDCCH AL adaptive algorithm of the base station 110.

In the present disclosure, the aggregation level prediction model (hereinafter, AL prediction model) 320 may mean a method of predicting which aggregation level of CCE the base station uses to transmit the PDCCH. For example, the AL prediction model 320 may be related to PDCCH aggregation level adaptive algorithm 220 operated by the base station 110. The AL prediction model 320 may be an artificial intelligence (AI) model or a non-AI model. AL prediction model 320 may include information for predicting the aggregation level of the PDCCH transmitted by the cell or base station 110.

The terminal 120 may obtain of an input data 310 of AL prediction model. Also, the terminal 120 may transmit the input data 310 of AL prediction model to the server or the base station 110.

In exemplary embodiments of the present disclosure, the input data 310 may be input to the AL prediction model 320, and the AL prediction model 320 may predict the output data 330 based on the input data.

In exemplary embodiments of the present disclosure, the input data 310 of the AL prediction model may include at least one of downlink condition indicators of the terminal, information of the DCI payload, for example a bit size of DCI), a PDCCH slot index, or information of a transmission direction.

For example, the downlink condition indicators of the terminal may include at least one of RSRP, a CQI or a an SNR. However, the downlink condition indicators of the terminal are not limited to the above-described example and may include any information indicating an environment in which the terminal receives the downlink from the base station.

For example, the transmission direction may include at least one of the downlink (DL) and the uplink (UL).

In exemplary embodiments of the present disclosure, the output data 330 of the AL prediction model may include at least one of the aggregation level related information of the downlink or the aggregation level related information of the uplink.

As an example, the input data 310 may be collected by terminals with reference to the input data needed by the PDCCH AL adaptive algorithm 220. For example, the terminal 120 may be attached to a cell such as an evolved node (eNB), the next generation node (gNB) and the like. The collected input data may be input to the AL prediction model 320 to predict the AL related information such as the AL related information at the current detection time. The terminal 120 may determine a PDCCH detection order, for example determining the AL order in which the PDCCH detection is performed, according to the AL related information predicted by the AL prediction model 320. The terminal 120 may detect the PDCCH according to the determined detection order rather than a default detection order.

The algorithm based on the AL prediction model 320 may use the prior information, for example the accurate aggregation level makes that the PDCCH is detected earlier compared with blindly performing the detection on the aggregation level. So the number of times of detections, for example blind detections, can be reduced, and the detection time of the PDCCH can be shortened, thereby reducing the power consumption caused by the detection, and achieving the purpose of power saving of the terminal.

Figure 4:
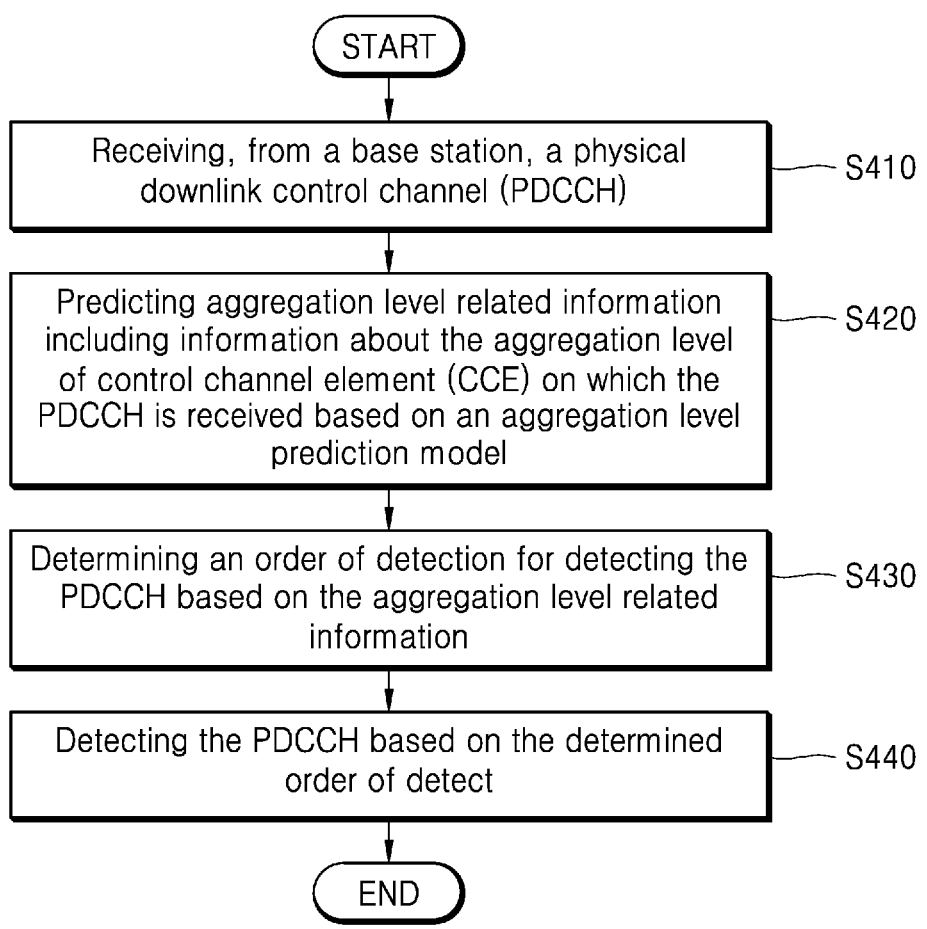
FIG. 4 illustrates a flow chart of method of detecting a PDCCH by the terminal according to an embodiment.

FIG. 4 illustrates a flow chart of method of detecting a PDCCH by the terminal 120 according to an exemplary embodiment of the present disclosure. At step S410, the terminal 120 may receive, from a base station 110, a physical downlink control channel (PDCCH).

step S420, the terminal 120 may predict aggregation level related information including information about the aggregation level of CCE on which the PDCCH is received based on an aggregation level prediction model.

In exemplary embodiments, the aggregation level prediction model may include information for predicting the aggregation level of the PDCCH received from the base station 110.

In exemplary embodiments, the terminal 120 may obtain a cell identification. to which the terminal is attached. The terminal 120 may identify the aggregation level prediction model that corresponds to the cell identification. For example, the cell identification may include a new radio cell global identity (NCGI). The NCGI may include at least one of a mobile country code (MCC), a mobile network code (MNC), or a next generation node (gNB) identification.

In exemplary embodiments, the terminal 120 may determine a prediction accuracy of the aggregation level prediction model. The terminal 120 may predict the aggregation level related information based on the aggregation level prediction model, when the prediction accuracy is equal to or greater than a preset value.

In exemplary embodiments, the terminal 120 may transmit to the base station 110 a reporting data for deciding an aggregation level of CCE. For example, the reporting data may be included in the input data 210 of PDCCH AL adaptive algorithm 220.

In exemplary embodiments, the terminal 120 may obtain an input data for predicting the aggregation level related information. For example, the input data may correspond to input data 310 of AL prediction model 320. The input data may include at least one of RSRP, a CQI, an SNR, a downlink control information (DCI) payload, or a PDCCH slot index. The input data may be related to the reporting data transmitted to the base station 110 for deciding an aggregation level of CCE. The terminal 120 may predict aggregation level related information by using the aggregation level prediction model based on the input data.

In exemplary embodiments, the terminal 120 may determine a probability of detecting the PDCCH for each aggregation level.

In exemplary embodiments, the terminal 120 may obtain the aggregation level prediction model from the server. Also, the terminal 120 may update the aggregation level prediction model based on the reporting data which is transmitted to the base station 110 for deciding an aggregation level of a CCE and a result data of detecting the PDCCH.

Examples of aggregation level prediction methods according to an embodiment of the present disclosure will be described in more detail in FIGS. 6-7 below.

At step S430, the terminal 120 may determine a detection order for detecting PDCCH based on the aggregation level related information.

In exemplary embodiments, the terminal 120 may determine the detection order based on the probability for each aggregation level. For example, the detection order may first detect the CCE corresponding to the aggregation level with the largest probability value.

At step S440, the terminal 120 may detect the PDCCH based on the determined detection order.

In exemplary embodiments, the terminal 120 may report, to the base station 110, PDCCH detection capability information. For example, the PDCCH detection capability information may indicate whether the terminal has successfully detected PDCCH according to the determined detection order. The terminal 120 may receive, from the base station 110, information of a DRX cycle which is determined based on the PDCCH detection capability information. The terminal 120 may detect the PDCCH according to the information of the DRX cycle. For example, the DRX cycle of the terminal 120 may be shorter than a DRX cycle of other terminal which detects the DCI based on the predetermined detection order according to blind detection. For example, the PDCCH detection capability information may be transmitted by a radio resource control (RRC) signaling.

Examples of aggregation level prediction methods according to an embodiment of the present disclosure will be described in more detail in FIGS. 6-16 below.

Figure 5:
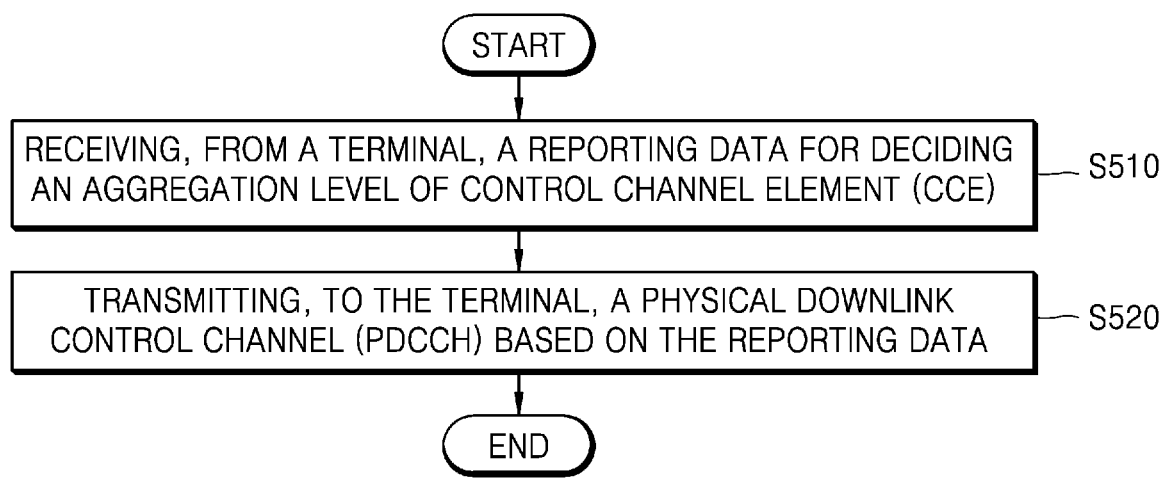
FIG. 5 illustrates a flow chart of method of transmitting a PDCCH by the base station according to an embodiment.

FIG. 5 illustrates a flow chart of method of transmitting a PDCCH by the base station 110 according to an exemplary embodiment of the present disclosure.

At step S510, the base station 110 may receive, from a terminal 120, a reporting data for deciding an aggregation level of a CCE.

At step S510, the base station 110 may transmit, to the terminal 120, a PDCCH based on the reporting data.

In exemplary embodiments, the base station 110 may receive, from the terminal 120, PDCCH detection capability information. For example, the PDCCH detection capability information may indicate whether the terminal 120 has detected PDCCH according to a determined detection order.

The base station 110 may determine information of a DRX cycle based on the PDCCH detection capability information and the base station 110 may transmit, to the terminal 120, the information of DRX cycle. For example, the base station 110 may determine that the DRX cycle of the terminal is shorter than a DRX cycle of other terminal which detects the DCI based on the predetermined detection order according to blind detection.

Figure 6:
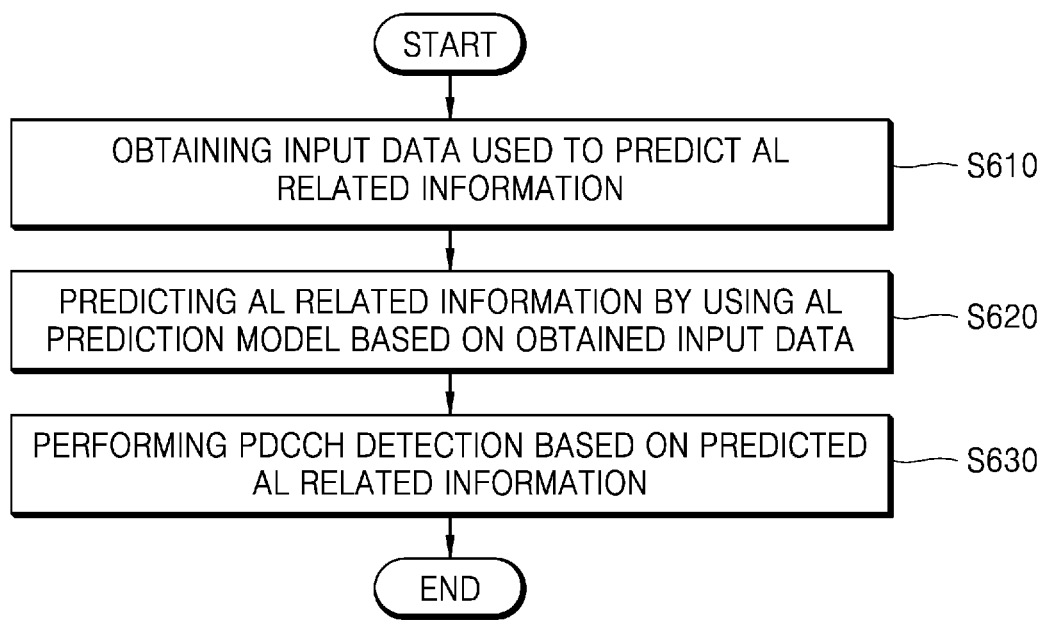
FIG. 6 illustrates a flowchart of a PDCCH detection method according to an embodiment.

FIG. 6 illustrates a flowchart of a PDCCH detection method according to an exemplary embodiment of the present disclosure. For example, the detection method shown in FIG. 6 may be performed by the terminal 120.

In step S610, the input data used to predict the AL related information may be obtained.

In step S620, the AL related information may be predicted by using the AL prediction model based on the obtained input data.

And in step S630, the PDCCH detection may be performed based on the predicted AL related information.

The initial position of detecting the PDCCH may be related to the aggregation level, for example the initial position may be an integer multiple of the AL, and thus in the case where the aggregation level is determined, the initial position of the PDCCH is also determined to a certain extent. In the case where it is scrambled through the RNTI, it may be determined whether the PDCCH exists by using the RNTI starting from the initial position.

In exemplary embodiments, when the predicted AL related information may include predicted AL order, the terminal 120 may perform the PDCCH detection based on the predicted AL order.

In exemplary embodiments, the input data needed to predict the AL related information may include link information. For example, the link information may include at least one of the RSRP, the CQI, the SNR, the DCI payload, or the PDCCH slot index.

In exemplary embodiments, the AL related information may include at least one of a detection order with respect to a plurality of ALs, a probability of each of the plurality of ALs, or an AL with the maximum probability in the plurality of ALs.

As an example, when the terminal 120 performs the PDCCH detection based on the predicted AL related information, if the AL related information includes the AL with the maximum probability in the plurality of ALs, then the terminal 120 may detect the PDCCH based on the predicted AL with the maximum probability. Also the terminal 120 may perform the PDCCH blind detection based on other ALs if the detection fails.

As an example, when the terminal 120 performs the PDCCH detection based on the predicted AL related information, the terminal 120 may determine the PDCCH detection order based on the predicted AL related information and perform the PDCCH detection based on the determined PDCCH detection order.

As an example, when the terminal 120 predicts the AL related information by using the AL prediction model, terminal 120 may find the AL prediction model corresponding to a cell to which the terminal 120 is attached according to a cell identification of the cell to which the terminal 120 is attached and a correspondence relationship between the AL prediction model and the cell identification and predict the AL related information by using the found AL prediction model based on the obtained input data.

As an example, the cell identification may include an NCGI. For example, the NCGI may include at least one of an MCC, an MNC, or a gNB identification.

As an example, before predicting the AL related information by using the found AL prediction model, the terminal 120 may determine that the found AL prediction model is valid based on a prediction accuracy of the found AL prediction model.

As an example, when the terminal 120 may find the AL prediction model corresponding to a cell to which the terminal 120 is attached, the terminal 120 may find the AL prediction model corresponding to the cell to which the terminal 120 is attached from the terminal 120 locally or the server.

In embodiments, the terminal 120 may determine whether to merge at least two AL prediction models according to at least one of: (a) information indicating performing the AL prediction model merging, (b) a similarity between outputs of the at least two AL prediction models, (c) a coincidence degree of the cell identification lists, or (d) a similarity between inputs of the at least two AL prediction models; and amending the correspondence relationship between the AL prediction model and the cell identification, so that respective cell identifications corresponding to the merged AL prediction models correspond to the same AL prediction model.

In embodiments, the terminal 120 may obtain the constructed AL prediction model from the terminal 120 locally or the server and train the obtained AL prediction model based on historical data of the terminal 120. For example, the historical data of the terminal 120 may include: (a) the input data reported to the base station by the terminal 120 and (b) AL information of the PDCCH that has been detected by the terminal 120.

In embodiments, terminal 120 may report PDCCH detection capability information to the base station 110. For example, the PDCCH detection capability information is capable of indicating whether the terminal 120 can perform the PDCCH detection based on the predicted AL related information.

In embodiments, the terminal 120 may obtain a DRX cycle configured by the base station 110. For example, wherein the DRX cycle may be configured by the base station 110 based on the PDCCH detection capability information reported by the terminal 120. The base station 110 may configure the terminal 120 that can perform the PDCCH detection based on the predicted AL related information with a DRX cycle shorter than the DRX cycle configured for the terminal that cannot perform the PDCCH detection based on the predicted AL related information. When the terminal 120 may perform the PDCCH detection based on the predicted AL related information, the terminal 120 may perform the PDCCH detection based on the predicted AL related information and the obtained DRX cycle.

In embodiments, when the terminal 120 reports the capability information to the base station 110, the terminal 120 may report the capability information through an information element (IE).

In embodiments, when the terminal 120 predicts the AL related information by using the AL prediction model, the terminal 120 may identify whether the currently obtained input data needed to predict the AL related information changes in comparison with historical input data and predict the AL related information by using the AL prediction model when it is identified that a change occurs. The terminal 120 may perform the PDCCH detection by using the AL related information predicted based on the historical input data when it is identified that no change occurs.

Figure 7:
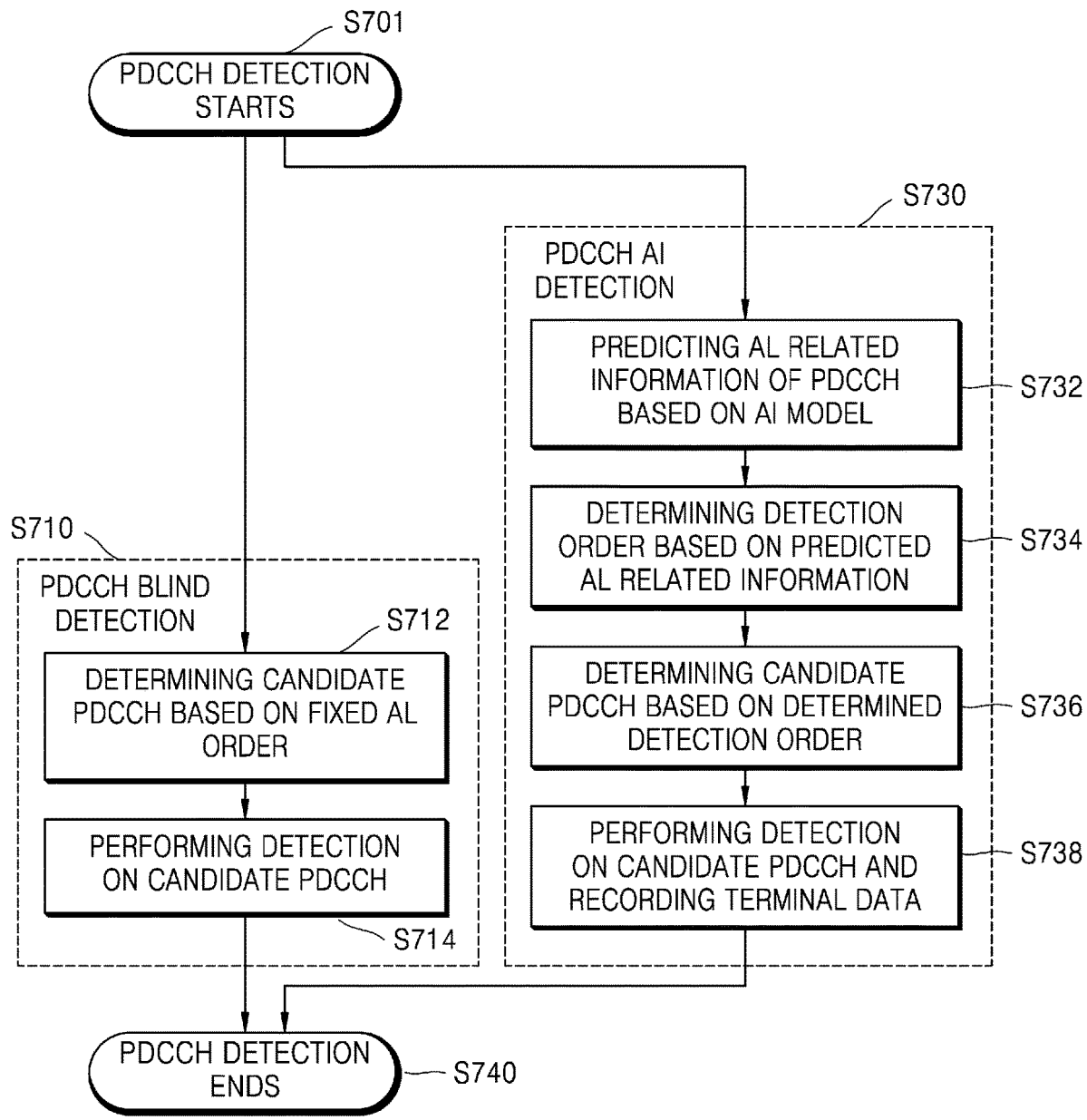
FIG. 7 illustrates a flowchart of a PDCCH detection method according to another embodiment.

FIG. 7 illustrates a flowchart of a PDCCH detection method according to an exemplary embodiment of the present disclosure.

In the present disclosure, AI detection may mean detecting PDCCH based on the AL prediction model 320.

As shown in FIG. 7, the PDCCH detection may be started at step S701. At step S730 if an AI detection condition is satisfied, for example the terminal is capable of predicting the AL related information based on the AI model and performing PDCCH detection based on the AL related information, an AI detection may be performed. At step S710 if the AI detection condition is not satisfied, the blind detection of the PDCCH is performed.

In exemplary embodiments of the present disclosure, the process of predicting the AL related information by using the AI model may also be referred to as the AI detection. The AI detection and the prediction based on the AI model are only exemplary and are not used to limit the scope of the present disclosure. The AI detection may be replaced with a non-AI detection, or replaced with the AL prediction including the AI detection and the non-AI detection, and the AI model may also be replaced with a non-AI model or replaced with the AL prediction model including the AI model and the non-AI model. The AI model may be, but is not limited to, a deep learning model, a deep neural network model, a deep network model, a three-layer neural network model, and the like.

Steps S712 and S714 relate to the blind detection. In step S712, candidate PDCCHs are determined based on a fixed AL order, for example a default AL order. For example, a plurality of ALs may have a default order, and each AL may correspond to a candidate PDCCH. For another example, the default order of ALs of which the sizes respectively are of 1, 2, 4 and 8 may be 1-→2-→4-→8. In step S714, because the order of the candidate PDCCHs is consistent with the AL order, the detection may be performed on the candidate PDCCHs based on the default AL order.

Steps S732 to S738 relate to the AI detection according to an embodiment of the present disclosure.

In step S732, the AL related information of the PDCCHs may be predicted based on the AI model. The terminal 120 may predict the AL related information based on the AI model.

In step S734, the detection order may be determined based on the predicted AL related information. In step S736, the candidate PDCCHs may be determined based on the determined detection order. For example, it may be determined that the AL order is 2-→4-→1-→8. In step S738, the detection may be performed on the candidate PDCCHs. Also, the data (which may also be referred to as terminal data including the input data needed to predict the AL related information, for example the link information and the detected AL information in the case where the PDCCH is detected is recorded to be used for subsequent process, for example, detecting accuracy of the AI module and/or training the AI module.

In an example, a PDCCH detection method may be suitable for the gNB, and the terminal may be a 5G terminal. The AI detection model may simulate the PDCCH AL adaptive algorithm performed by the gNB, to predict the AL related information of the PDCCH. However, this example is provided only for description and is not intended to limit the protection scope of the present disclosure, and the method of the present disclosure is also suitable for the terminal, the base station, the server or network of 3G or 4G.

PDCCH detection may then end at step S740.

Corresponding to the detection method, a training method and a DRX configuration method as follows may be implemented.

According to another exemplary embodiment of the present disclosure, a training method of the AL prediction model may be provided. According to the training method of the AL prediction model, the terminal 120 or the server may receive related data of the PDCCH detection reported by the terminal 120. Also, the terminal 120 or the server may train the AL prediction model based on the related data of the PDCCH detection reported by the terminal 120. Also, the server may transmit the trained AL prediction model to the terminal 120. For example, the training method of the AL prediction model may be performed by the server or the terminal 120.

As an example, the related data of the PDCCH detection reported by the terminal 120 may include link information between the terminal 120 and the base station 110, and AL information of the PDCCH that has been detected through the blind detection or AI detection by the terminal 120. For example, the terminal 120 or the server may train one AL prediction model based on the reported related data of the PDCCH detection corresponding to a plurality of base stations of the same type. In another example, the terminal 120 or the server may perform the training of the AL prediction model with respect to respective base stations, respectively, for example training one AL prediction model based on the reported related data of the PDCCH detection corresponding to each base station. In another example, the terminal 120 or the server may train one AL prediction model with respect to all base stations for example training one AL prediction model based on all reported related data of PDCCH detection.

According to another exemplary embodiment of the present disclosure, a DRX configuration method is provided. The base station 110 may receive PDCCH detection capability information from the terminal 120. The base station 110 may also configure the DRX cycle according to the received capability information. For example, the PDCCH detection capability information may be capable of indicating whether the terminal 120 can perform the PDCCH detection based on the predicted AL related information.

As an example, the PDCCH detection capability information may be carried by the information element (IE).

As an example, the base station 110 may configure the terminal 120 that can perform the PDCCH detection based on the predicted AL related information with the DRX cycle shorter than the DRX cycle configured for the terminal that cannot perform the PDCCH detection based on the predicted AL related information.

The training method and the DRX configuration method according to the exemplary embodiment of the present disclosure may be implemented at the network side. For example, the training method may be implemented by the server. For example, the DRX configuration method may be implemented by the base station 110. In addition, the training method may also be implemented at the terminal 120.

Figure 8:
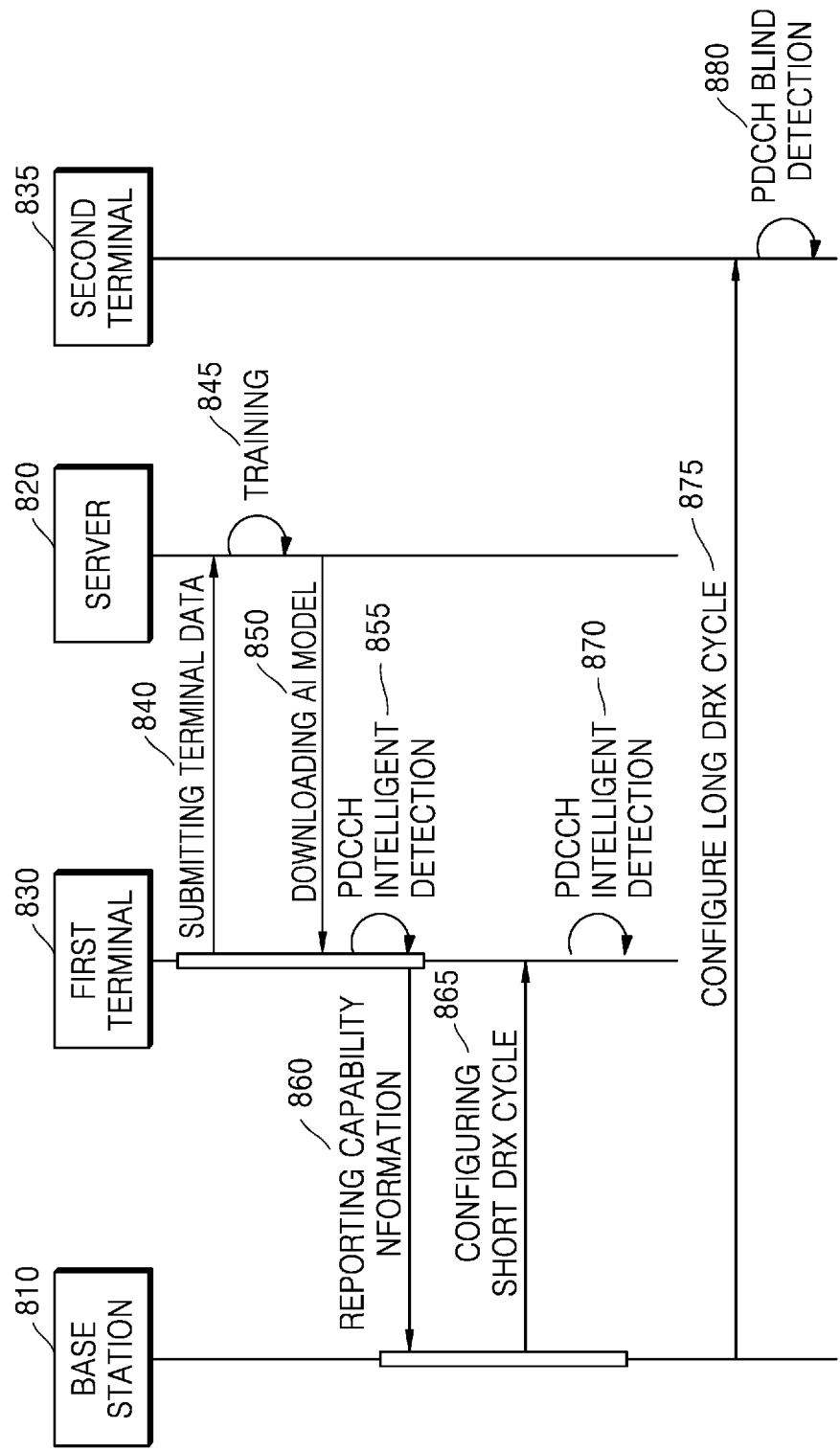
FIG. 8 illustrates a diagram for explaining a method of detecting a PDCCH. according to an embodiment.

FIG. 8 illustrates a diagram for explaining a method of detecting a PDCCH. according to an exemplary embodiment of the present disclosure.

The network side according to the exemplary embodiments of the present disclosure may include at least one of base station 810 or server 820. For example, the base station 110 may correspond to a base station 810 and the terminal 120 may correspond to a first terminal 830.

Terminals according to the exemplary embodiments of the present disclosure may be classified into two types according to their AL detection capability. The first terminal 830 may mean a terminal supporting the AI detection. The first terminal 830 may have an AL detection capability. The first terminal 830 may be capable of performing the PDCCH detection based on the predicted AL related information. The first terminal 830 may also be referred to as the terminal having an AL intelligent detection capability because the terminal supporting the AI detection may have an AL detection capability. A second terminal 835 may mean another terminal which does not support the AI detection.

As an example, the server 820 may be separated from the first terminal 830 or base station 810. As another example, the server 820 may be included in the base station 810 or the first terminal 830. At 840, the first terminal 830 may submit a terminal data to the server 820. At 845, the server 820 may train an AI model. At 850, the first terminal 830 may download the AI model from the server 820. At 855, the first terminal 830 may perform the PDCCH intelligent detection. At 860, the first terminal 830 may transmit to the base station PDCCH detection capability information. At 865, the base station 810 may configure short DRX cycle for the first terminal 830. At 870, the first terminal 830 may perform PDCCH intelligent detection. At 875, the base station 810 may configure long DRX cycle for the second terminal 835. At 880, the second terminal 835 may perform PDCCH blind detection.

The base station 810 may configure a DRX cycle for the first terminal 830 and the second terminal 835. At 865, the base station 810 may configure a short DRX cycle for the first terminal 830 which supports AI detection. At 875, the base station 810 may configure a long DRX cycle for the second terminal 835 that does not support the AI detection.

As an example, the first terminal 830 which has the AL detection capability, for example supporting the AI detection, and the second terminal 835 which does not have the AL detection capability may be deployed within a coverage area of the base station 810. The base station 810 may transmit PDCCH to the terminals regardless of whether the terminals have the AL detection capability. The first terminal 830 may have an intelligent power saving function, and may detect the PDCCH more quickly than that not having the AL detection capability, thereby reducing the power consumed by the PDCCH detection. Therefore, the first terminal 830 may consume less power than the second terminal 835.

As an example, an interface may be configured between the network side, for example the base station 810 or server 820, and the first terminal 830, to transmit the capability information. The interface may be implemented as a standard interface, for example, a new information element (IE) may be added on an RRC signaling. The IE may be used to transmit the capability information. For example, the first terminal 830 may report the capability information to the base station 810, and the capability information may indicate whether the first terminal 830 can perform the PDCCH detection based on the predicted AL related information. Also, the IE may also be used to transmit the AL prediction model. For example, the first terminal 830 may receive or download the AL prediction model trained by the server 820 from the server 820, and the first terminal 830 may submit the terminal data to the server 820.

At 840, the terminal data may be reported in real-time or non-real-time by the first terminal 830. Also, at 860, the capability information may be reported in real-time or non-real-time by the first terminal 830.

In the case of non-real-time reporting, the first terminal 830 may report at least one of capability information or the terminal data according to a triggering condition. For example, the triggering condition may include at least one of the amount of data reaching a predetermined amount, the time reaching a reporting time (for example the time specified in the reporting cycle being reached, and the reporting time may be appointed through negotiations or agreements, in units of days, weeks, or months and the like), the storage amount of the storage of the terminal reaching a predetermined storage amount (for example, the storage being full), or the prediction accuracy of the existing AL prediction model being lower than a predetermined accuracy. The trigger condition is not limited to the above example.

The collected terminal data may be reported when a data amount of the terminal data reaches a predetermined value because the capacity of the storage of the terminal may be limited. Also, the stored data may be deleted after the reporting, to store new data. The data amount may be measured by bits, for example, the reporting may be performed when the bits occupied by the data amount reach a predetermined number of bits.

The storage of the first terminal 830 may store the above terminal data, and the storage amount may also be measured by units such as bits and the like. The object of the data amount based trigger condition may be the data collected by the terminal and the object of the storage amount based trigger condition may be the storage of the first terminal 830, respectively.

When the first terminal 830 uses the old AI model, and the AL prediction accuracy cannot reach the threshold, and it is considered that the base station 810 updates the PDCCH aggregation level adaptive algorithm, the input and output information of the AI model may be be updated. So the first terminal 830 may upload the terminal data.

The server 820 may train the AL prediction model based on the terminal data received by the first terminal 830. When the first terminal 830 includes the server 820, the server 820 may be used as a unit of the first terminal 830, so that the first terminal 830 may train the AL prediction model locally.

As an example, the base station 810 may configure a shorter DRX cycle for the first terminal 830 having the AL detection capability. The short DRX cycle may mean a short sleep period and a long scheduling time. The first terminal 830 may perform the PDCCH detection at a time out of the DRX cycle. For example, the first terminal 830 may detect the PDCCH based on the AL prediction model, wherein when the AL prediction model is the AI model, the PDCCH detection may be referred to as PDCCH intelligent detection.

But if the first terminal 830 detects the PDCCH using the PDCCH intelligent detection which spends less number of times of detections, the first terminal 830 can detect the PDCCH faster than using the blind detection. So, the terminal power consumption may not be increased, on the contrary, the opportunity for the first terminal 830 to be scheduled may be increased, which improves terminal response speed and throughput, for example the performance of the terminal supporting the Massive MIMO is improved, improves the data transmission efficiency, and reduces the time delay, to meet an energy efficiency purpose required by a standard. On the other hand, The base station 810 can configure a longer DRX cycle for the second terminal 835 not having the AL detection capability, thereby ensuring that the second terminal 835 does not consume excessive power due to the PDCCH blind detection, but the second terminal 835 may have a slow response speed, long time delay, and low throughput.

Figure 9:
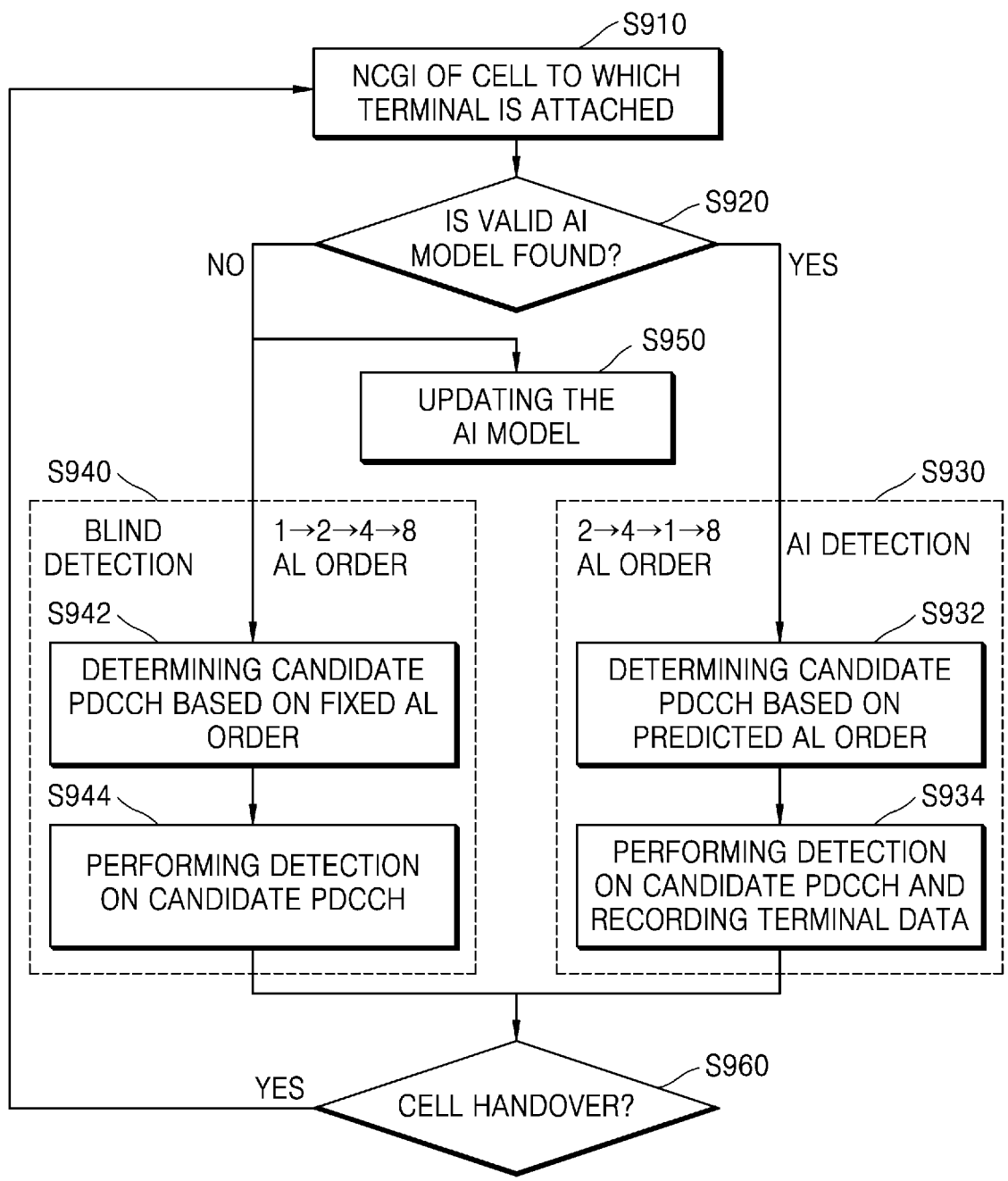
FIG. 9 illustrates a flowchart of a PDCCH detection according to another embodiment.

FIG. 9 illustrates a flowchart of a PDCCH detection according to an exemplary embodiment of the present disclosure.

The PDCCH detection shown in FIG. 9 may be implemented at the terminal 120, and the detection method may include: determining the NCGI of the cell by the terminal attached to the cell; finding a valid AL prediction model, for example the AI model, according to the NCGI; and if the valid AI model is found, performing the AI detection, and if the valid AI model is not found, performing the blind detection or updating the AI model from the server.

At step S910, the terminal 120 may determine the NCGI of the cell to which the terminal is attached. For example, the identity of cell may be NCGI.In exemplary embodiments, the terminal 120 may be attached to the cell, for example a 5G base station cell. After attachment to the cell, the terminal 120 may obtain the NCGI of the cell. For example, the NCGI may be used to uniquely identify the cell globally. The NCGI may include MCC, MNC and gNB identification (ID), and the cell ID.

At step S920, the terminal 120 may identify valid AL prediction model, for example the AI model according to the NCGI.

In exemplary embodiments, the terminal 120 may find, for example search for, the valid AI model according to the NCGI, for example a local search or a remote search.

As an example, the NCGI herein may be suitable for a 5G cell and may be replaced with a cell identification suitable for a 3G or 4G cell. In this way, the finding the AI model may include: finding the AI model corresponding to the cell according to the correspondence relationship between the AI model and the cell identification of the cell to which the terminal is attached, and judging whether the prediction accuracy of the AI model satisfies a requirement, and determining that the AI model is valid when the prediction accuracy meets the requirement, wherein the predicting the AL related information may include: predicting the AL related information based on the valid AI model.

At step S930, if the valid AI model is identified, the terminal 120 may perform the AI detection.

In exemplary embodiments, if the valid AI model is found, the AI detection is performed. After the AI detection or blind detection of the PDCCH, it can be determined whether a cell handover occurs at step S960. If the cell handover occurs, the terminal 120 may obtain a new NCGI and perform finding of the valid AI model and subsequent steps.

At step S932, the terminal 120 may determine candidate PDCCH based on predicted AL order.

After the AI model is obtained or found, the valid AI model may be identified through a prediction accuracy, and the step S930 of AI detection may also be performed. In the AI detection process, the terminal data, for example the input data of the AI detection described above, may be input into the AI model, to obtain the output of the AI model. The output of the AI model may include the AL order, for example the AL order may be 2-→4-→1-→8, and each AL may correspond to one candidate PDCCH. Each candidate PDCCH may be detected based on the AL order, to determine the PDCCH that is configured for the terminal by the base station.

At step S934, the terminal 120 may perform detection on candidate PDCCH. After determining the PDCCH configured by the base station 110 for the terminal 120, the terminal data and the AL of the detected PDCCH may also be recorded.

At step S940, if the valid AI model is not found, the terminal 120 may perform the blind detection. Also, if the valid AI model is not found, at step S950 the terminal 120 may update the AI model from the server.

In exemplary embodiments, the blind detection is performed or an attempt to obtain the AI model from the server is made. After the blind detection of the PDCCH, it can be determined whether a cell handover occurs at step S960; if the cell handover occurs, the terminal obtains a new NCGI and performs finding of the valid AI model and subsequent steps.

In the blind detection process, the detection is performed based on the fixed AL order, for example the AL order is 1-→2-→4-→8, each AL may correspond to one candidate PDCCH, and the PDCCH that is configured for the terminal by the base station is found from respective candidate PDCCHs based on the fixed AL order.

At step S960, the terminal may determine whether the cell handover occurs.

In exemplary embodiments, it can be judged whether the cell handover occurs after the AI detection at step S930 or the blind detection at step S940. If the cell handover occurs, the step S910 of determining the NCGI of the cell and the subsequent steps may be performed.

Figure 10:
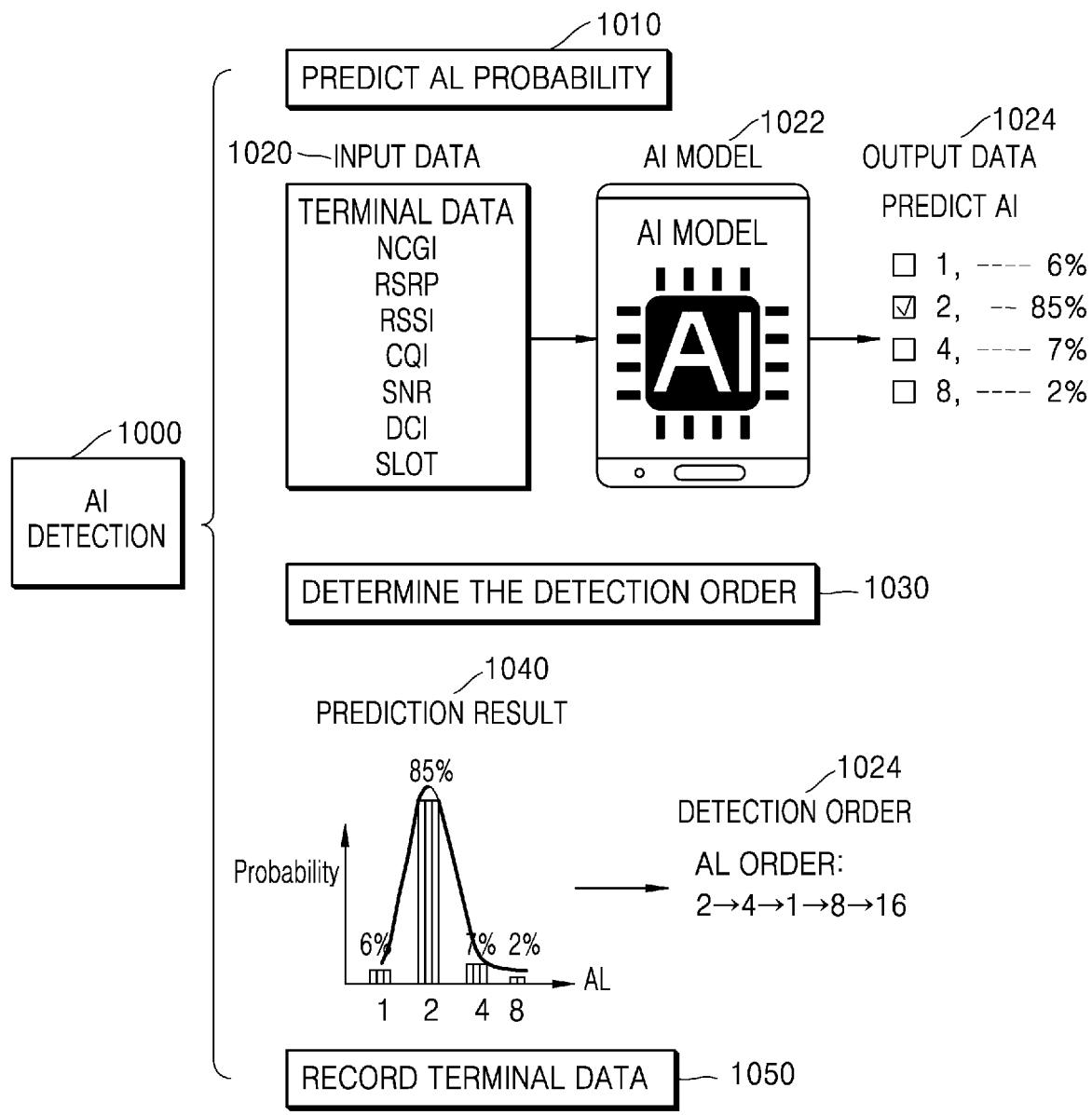
FIG. 10 illustrates a method of an AI detection according to an embodiment.

FIG. 10 illustrates a method of an AI detection according to an exemplary embodiment of the present disclosure. The method may include predicting an AL probability at 1010, determining a detection order at 1030, and recording terminal data at 1050.

The difference between the AI detection 1000 of the PDCCH and the blind detection of the PDCCH may be described. The AI detection 1000 may perform the PDCCH detection and extraction based on the predicted AL order. On the other hand, the blind detection may perform the PDCCH detection and extraction based on a fixed AL order, for example a default AL order.

The AI detection 1000 may be performed by using the AI model 1022. The input data 1020 of the AI model 1022 may be collected by the terminal 120, and the input data 1020 may be related parameters of the PDCCH AL adaptive algorithm of the gNB (e.g., base station 110). The input data 1020 may include at least one of the RSRP, the received signal strength indication (RSSI), the CQI, the SNR, the DCI bit size, or the PDCCH slot index. The output data 1024 of the AI model 1022 may include the probability of each AL of the uplink (UL) and the downlink (DL), for example, the probability of each AL of the DL and/or the probability of each AL of the UL.

In exemplary embodiments of the present disclosure, according to a correlation between the AL of the DL and the AL of the UL, the AL related information of the UL and the AL related information of the DL may be predicted by using the same AL model 1022. Of course, using two AL models to predict the AL related information of the UL and the AL related information of the DL respectively is not excluded.

In exemplary embodiments of the present disclosure, the input data 1020 and the output data 1024 related to the PDCCH detection of a specific base station 110 may be collected by the terminal 120. Also, the correlation relationship between the input data 1020 and the output data 1024 may embody the PDCCH AL adaptive algorithm of the specific base station 110, which may be a form of expression of the algorithm in a specific scenario. Therefore, the AI model 1022 may be obtained by learning the collected data, and AL related information (for example, the probability of the AL, etc.) corresponding to the new input data may be predicted based on the obtained AI model.

As an example, according to prediction results 1040 of FIG. 10, the probability of the AL of a size of 1 is 6%, the probability of the AL of a size of 2 is 85%, the probability of the AL of a size of 4 is 7%, and the probability of the AL of a size of 8 is 2%. Referring to FIG. 10, the detection order, for example the AL order, may be determined based on the prediction results 1040. With arrangement in a descending order of the probabilities, it may be determined that the AL order 1042 is 2-→4-→1-→8.

The terminal 120 may first determine the PDCCH of a length of 2 CCEs at the initial position corresponding to AL=2, then determine a PDCCH of a length of 4 CCEs at the initial position corresponding to AL=4, and so on, until the PDCCH is found or a predetermined number of times or number of rounds of detections is reached. For example, each AL may correspond to one detection.

As an example, assume an actual AL=2. If the PDCCH is detected according to the blind detection and the blind detection starts from AL=1, two detections are needed to find the PDCCH according to fixed order of the blind detection. However, if the PDCCH is detected according to AI detection 1000, only one detection is needed to find the PDCCH because the AI detection 1000 starts from AL=2. So the AI detection 1000 may reduce the number of rounds of detections. Compared with the blind detection, because the number of times of PDCCH detections is reduced, the power consumption of the PDCCH detection is reduced, thereby achieving the purpose of power saving of the terminal (especially the 5G terminal).

In addition, the network may be performed based on the NR protocol, in this case the AL may be 16. For example, if the probability of AL=16 is 0%, the order of AL=16 is after AL=8 because the probability of AL=8 is 2%.

Figure 11:
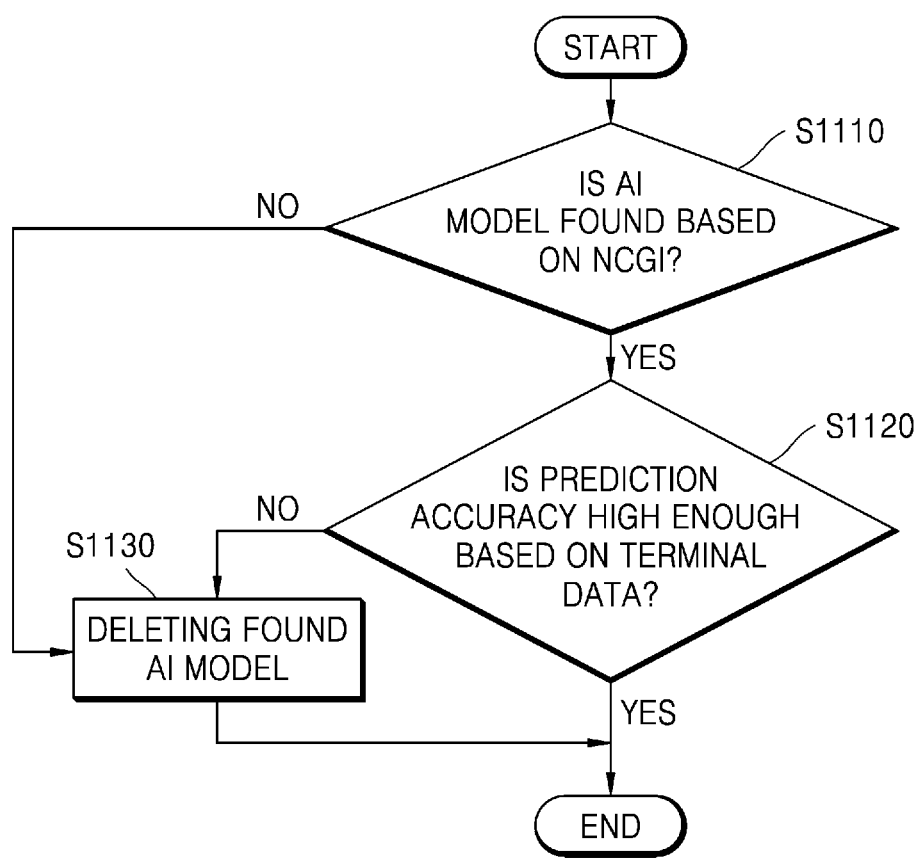
FIG. 11 illustrates a flowchart of finding the AI model according to an embodiment.

FIG. 11 illustrates a flowchart of finding the AI model according to an exemplary embodiment of the present disclosure.

Referring to FIG. 11, the process of finding the AI model may include finding the AI model based on the NCGI at step S1110; and judging whether the accuracy of the AI model satisfies the requirement at step S1120. If the requirement is satisfied, it indicates that the valid AI model is found; and if the requirement is not satisfied, it indicates that the valid AI model is not found, and the found AI model may be deleted at step S1130.

At step S1110, the terminal 120 may identify the AI model based on the NCGI.

For example, when the terminal 120 is attached to the cell and has registered for a web service, the NCGI of the cell may be obtained. The correspondence relationship between the NCGI and the AI model may exist, and thus, the AI model may be found based on the NCGI.

At step S1120, the terminal 120 may identify whether the accuracy of the AI model satisfies the requirement.

The success probability of the prediction (i.e., the prediction accuracy, or detection accuracy) may be statistically calculated in the case where the number of times of the detections reaches the predetermined number of times or the detection time reaches the predetermined time, and when the prediction accuracy reaches the predetermined value, the AI model is determined to be valid.

As an example, the prediction accuracy may be a sum of success detection probabilities of each round, for example each detection round. Based on a trade-off between a calculated amount and a statistical effect (the accuracy of the statistical results), whether the success detection probability of each of the front N, for example N=2, rounds reaches a predetermined value may be determined. In this case, if the predetermined value is reached, the AI model may be determined to be valid. Based on statistical effect, the success detection probabilities of a plurality of rounds may be compared to a predetermined threshold, for example the sum of the probabilities of the front three rounds may be compared to a predetermined threshold, and the sum of the probabilities of the front four rounds may be compared to a predetermined threshold, and if the sum is greater than or equal to the predetermined threshold, the AI model may be determined to be valid.

Whether the AI model is valid, for example whether the valid AI model is found, may be notified to the terminal 120.

At step S1130, the terminal 120 may delete the identified AI model. When the obtained AI model is not the valid AI model, the terminal 120 may delete the obtained AI model. For example, the terminal may delete the correspondence relationship between the cell identification, for example the NCGI, and the obtained AI model.

In order to quickly identify the AI model based on the NCGI at the terminal 120, a mapping table may be established and maintained to represent the correspondence relationship between the NCGI and the AI model. The terminal 120 may obtain or download the initial mapping table from the server based on information such as country, location, and the like. The mapping table may record the NCGI and the AI model, as for example information such as the name, ID of the model and the like, corresponding to the NCGI. Table 1 shows a mapping table according to an exemplary embodiment of the present disclosure.

TABLE 1

| AI model list | NCGI list |
| --- | --- |
| AI model 1 | NCGI 001, NCGI 003, NCGI 005 . . . |
| AI model 2 | NCGI 002, NCGI 028, NCGI 008 . . . |
| . . . | . . . |
| AI model N | NCGI 015 . . . |

As shown in Table 1, each AI model may correspond to one or more NCGIs. N may be a natural number and may mean the number of AI model. Each row of NCGIs in the NCGI list may correspond to a series of base stations employing the same PDCCH AL adaptive algorithm.

In an exemplary embodiment, the terminal 120 may manage the relationship between the AI model and the NCGI, for example the above mapping table. The terminal 120 may identify the corresponding AI model based on the NCGI. The terminal 120 may add an item to the mapping table for recording the AI model and the corresponding NCGI list. The terminal 120 may perform the merging, for example merging according to the type, when it is found that two or more AI models may be merged.

As an example, the merging triggering condition may include at least one of (a) the AI server may push a message to the terminal, and the message may indicate that it is possible to merge the AI models; (b) the AI models are evaluated using specific test data, and the similarity between the outputs of the plurality of AI models may exceed a certain threshold; (c) the coincidence degree of the NCGIs or the value of each item included in the NCGIs,) may exceed a predetermined threshold, for example, the values of a plurality of items belonging to different NCGIs being the same may indicate that the plurality of items coincide; or (d) the similarity of the input data of the AI models may exceed a predetermined threshold.

As an example, the terminal 120 may delete a specific AI model and add the NCGI of the deleted AI model to the NCGI list corresponding to another AI model.

As an example, when the AI model is not suitable for a current network, for example, when it is found that the base station 110 is no longer suitable for a certain AI model, the NCGI corresponding to the AI model can be deleted from the NCGI list. For example, the case where the AI model is not suitable for the current network may include the prediction result of the AI model conflicts with the newly collected data, for example the predicted AL or the probability of the AL is different from the AL obtained by the actual detection or the probability of the AL. The conflict may mean that a new base station is found or connected to, or the configuration of the base station changes.

As an example, if the newly collected terminal data conflicts with the historical terminal data, it may mean that the PDCCH AL adaptive algorithm of the base station 110 has been upgraded or modified, or that the base station 110 has switched the PDCCH AL adaptive algorithm. In this case, the AI model may be not suitable for the current network, and the corresponding AI model may also be deleted.

Figure 18:
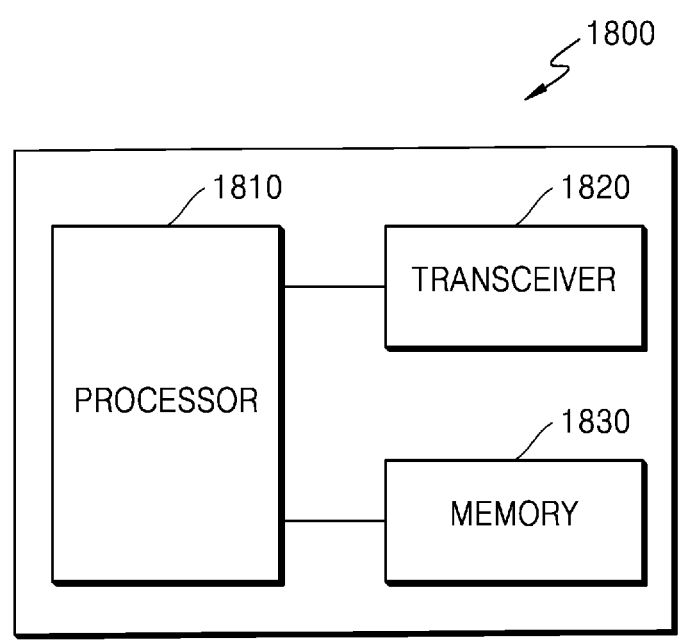
FIG. 18 schematically illustrates a terminal according to an embodiment.

As an example, referring to the FIG. 18, the above deletion and merging operations may be implemented by a deleting unit and a merging unit of the terminal 120, respectively.

In the exemplary embodiments of the present disclosure, the terminal 120 may learn the PDCCH AL adaptive algorithm of the base station 110, for example gNB. For example, each AI model operated by the terminal 120 may be learned the PDCCH AL adaptive algorithm of the base station 110 in the network, and the PDCCH AL adaptive algorithm may be bound to a type of the base station equipment and a specific software version. In a real network environment, when an operator uses the same base station equipment and the same software version for the base stations in a certain area, the AI models corresponding to these base stations are the same or may be merged.

Considering that each base station may be uniformly identified by the NCGI, a series of base stations may be represented by a row in the NCGI list of the mapping table. Also, the row in the NCGI list may correspond to one AI model. That is, the series of base stations may adopt the same PDCCH AL adaptive algorithm.

Figure 12:
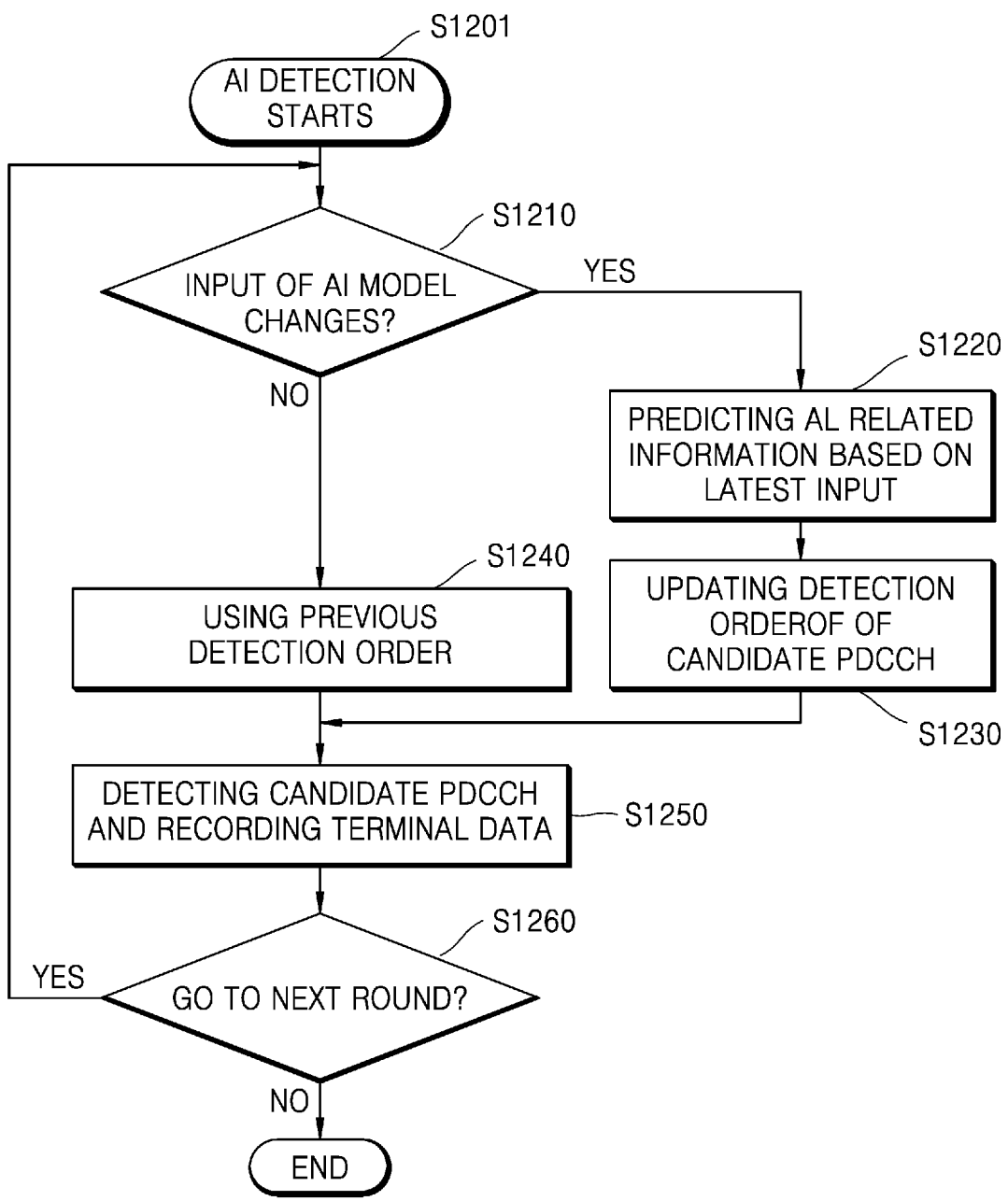
FIG. 12 illustrates a flowchart of the AI detection according to an embodiment.

FIG. 12 illustrates a flowchart of the AI detection according to an exemplary embodiment of the present disclosure.

In the present disclosure, AI detection may mean detecting PDCCH based on the AL prediction model 320. The AI model can be referred to as a complete AI model, and the complete AI model may predict information such as the probability and the like of each AL. After a valid and complete AI model is identified, the terminal 120 may perform the AI detection based on the identified AI model to avoid the PDCCH blind detection and achieve the purpose of power saving. When the terminal 120 may perform the AI detection process, the terminal 120 may predict the probability of the AL, determine the AL order used in the detection process based on the predicted probability, and perform the PDCCH detection according to the determined AL order. Embodiments above have described the AL detection, which is omitted here. The present exemplary embodiment improves the AI detection to avoid repeated operations to further save the power.

At step S1201, the terminal 120 has finished finding through the NCGI and obtained the complete and valid AI model suitable for the network currently registered by the terminal 120. The AI detection process may include: detecting whether the input data of the AI model changes at step S1210, predicting the AL related information such as the probability of AL and the like for predicting the AL based on the new input data (the changed input data) if the input data changes at step S1220, determining detection order of candidate PDCCH based on the predicted AL related information at step S1230, and using the previously used AL order for detecting the PDCCH without performing the prediction operation if the input data does not change at step S1240), thereby avoiding repeated prediction. Then, at step S1250 the terminal data can be recorded, and at step S1260 it can be determined whether to go to the next round of detection. As an example, the case where the input data changes includes, but is not limited to: a) when the base station handover occurs, the unique identification of the base station 110, for example the NCGI, may change and the input data associated with the NCGI may change; and b) when the terminal 120 changes or the network environment between the terminal 120 and the base station 110 changes, although the NCGI does not change, one or more of the input data changes, for example, at least one of the RSRP, the RS SI, the CQI, the SNR, the DCI bit size, and the PDCCH slot index changes.

As an example, the terminal 120 may store the AL value or probability or store the AL order through the storage unit and upload the stored content to the server, so as to be used for the AI model training and/or the determining of the prediction accuracy of the AI model. Subsequently, it can be determined whether to enter the next round of detection, and if so (the prediction accuracy is high enough, for example, higher than the predetermined value), the step of judging whether the input data changes is performed.

Figure 13:
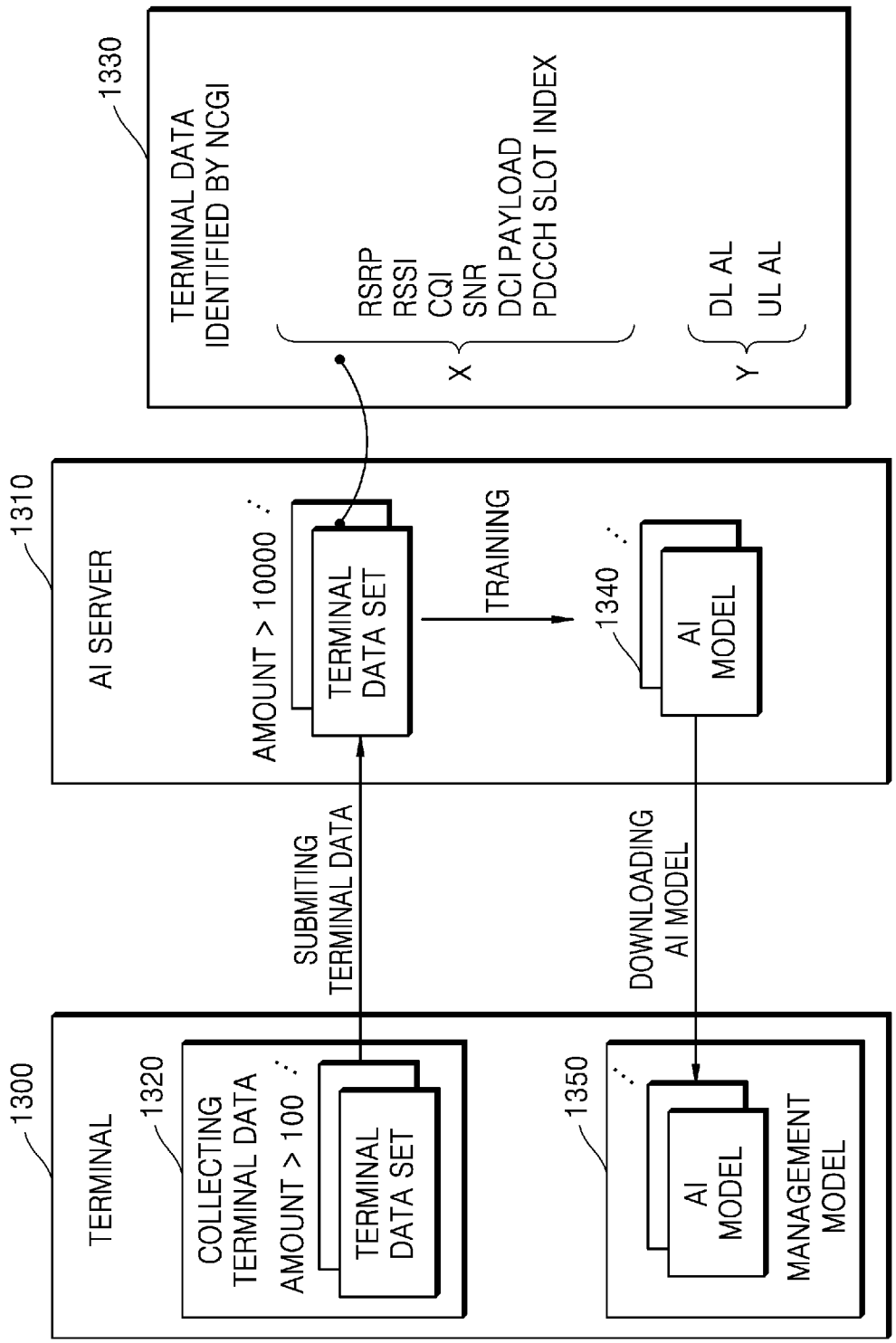
FIG. 13 illustrates an interaction between the terminal and the AI server according to an embodiment.

FIG. 13 illustrates an interaction between the terminal 1300 and the AI server 1310 according to an exemplary embodiment of the present disclosure.

In the present disclosure, AI server may correspond to the server described above. The AI server 1310 is an example, and can also be replaced with any server, for example, a non-AI server. The exemplary embodiment of the present disclosure is illustrative of an example in which the NCGI is used as the cell identification, and is not used for limitation, for example, other CGIs may also be used to identify the cell.

According to the exemplary embodiment of the present disclosure, when the terminal 1300 cannot find the valid AI model locally, or when the terminal 1300 finds that the local AI model does not satisfy the requirement, for example the prediction accuracy does not satisfy the requirement, the terminal 1310 may attempt to obtain a suitable AI model from the AI server 1310. The terminal 1300 may also attempt to collect the data related to the PDCCH detection, or data related to the PDCCH AL adaptive algorithm, and upload the collected terminal data 1320 to the AI server 1310. The AI server 1310 may be located at the network side or disposed at the terminal 1300. In this case, the terminal 1300 may update the AI model 1340 when needed, or the terminal 1300 may upload the collected terminal data 1320, when for example the AI server may not have obtained the data, to the AI server 1310 in time.

As an example, the terminal 1300 has finished finding the AI model 1340 through the NCGI but does not obtain the valid AI model 1340 suitable for the network currently registered by the terminal 1300. When the terminal 1300 does not find the valid AI model 1340, the PDCCH blind detection may be performed. The terminal 1300 may attempt to collect terminal data 1320 related to the PDCCH detection, and upload the collected terminal data 1320 to the AI server 1310 periodically or after the number of terminal data 1320 reaches a certain threshold for example, 100 pieces of data. The terminal 1300 may also download and manage the AI model 1340 corresponding to the NCGI from the AI server 1310 based on the NCGI of the network currently registered by the terminal 1300 using management model 1350.

As an example, the AI server 1310 may be configured to collect and store the terminal data 1320 submitted by each terminal 1300. Also, the AI server 1310 may be configured to train the AI model 1340 based on the collected terminal data 1320 and provide the trained AI model 1340 for each terminal 1300.

As an example, the terminal 1300 may upload and submit the terminal data 1320 by at least one of: a) periodically submitting the terminal data 1320; b) submitting the terminal data 1320 when the amount of data of the collected terminal data 1320 exceeds a threshold; or c) submitting the terminal data 1320 according to a policy negotiated with the AI server 1310.

As an example, the terminal data 1330 may include two parts, i.e., an input X and an output Y. For example, the input X may include, but is not limited to, at least one of the RSRP, the RSSI, the CQI, the SNR, the DCI payload, or the slot index. For example, the output Y may include the AL related information of the DL and the AL related information of the UL. The input X and the output Y may correspond to each other one by one, and a set of terminal data may be represented by (X, Y), and the base station corresponding to the set of terminal data may be identified by the cell identification, for example the NCGI.

Because the cell identification, for example the NCGI, may uniquely identify the base station, the AI server 1310 may use the NCGI to distinguish the terminal data 1330 belonging to different base stations. In addition, the AI server 1310 may label the source of the terminal data 1330 by using the unique identification and time information of the terminal 1300. Based on this, $(X_1, Y_1), (X_2, Y_2), \ldots, (X_N, Y_N)$ may be used to represent a series of terminal data belonging to the specific base station labeled using the same NCGI. Since it does not need to consider the source of the terminal data while training the AI model 1340, the same NCGI is used to identify the terminal data $(X_1, Y_1), (X_2, Y_2), \ldots, (X_N, Y_N)$ during the AI training.

When the amount of data of the terminal data 1330 collected by the AI server 1310 reaches a certain threshold, for example, 10000 pieces of data, the AI server 1310 may start the training of the AI model 1340. At the AI server 1310, the cell identification, for example NCGI, may be used to identify the terminal data 1330. The AI server 1310 may aggregate all the terminal data 1330 belonging to the specific NCGI, and the AI model 1340 of the base station identified by the specific NCGI is trained based on the aggregated data. This training based on the terminal data 1330 of the single NCGI can be referred to as a single NCGI training.

In addition, because a plurality of base stations may adopt the same network equipment and use the same software version, a series of NCGIs may correspond to one AI model 1340, so the AI server 1310 may perform AI model 1340 training based on the terminal data 1330 corresponding to the series of NCGIs, so that the plurality of base stations share the one AI model 1340. This training using terminal data corresponding to the series of NCGIs may be referred to as the multi-NCGI training.

Figure 14:
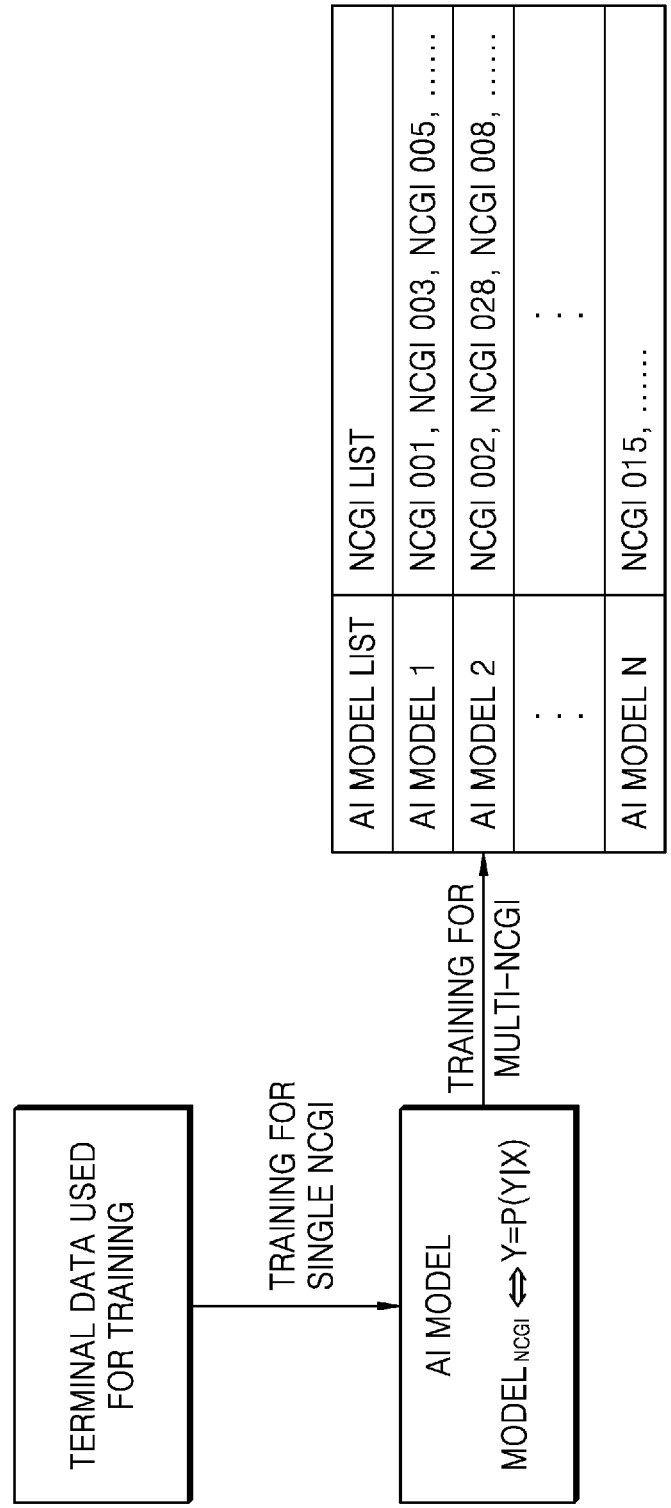
FIG. 14 illustrates the single NCGI training and the multi-NCGI training according to an embodiment.

FIG. 14 illustrates the single NCGI training and the multi-NCGI training according to an exemplary embodiment of the present disclosure.

According to the exemplary embodiment of the present disclosure, the training of the AI model is performed when the terminal data corresponding to the specific base station collected by the AI server or the terminal data corresponding to the series of base stations are accumulated to a certain extent.

As an example, $(X_1, Y_1), (X_2, Y_2), \ldots, (X_N, Y_N)$ may be used to represent the terminal data corresponding to the specific NCGI. Numbers 1, 2, . . . , and N represent the sequence number of the terminal data. Because the AI server may use the identification and the time information of the terminal 120 to label the source of the terminal data, the numbers 1, 2, . . . , N may be associated with the terminal identification and the time information, and of course, the numbers 1, 2, . . . , N may not be associated with the above terminal identification and time information.

As an example, $(X_1, Y_1), (X_2, Y_2), \ldots, (X_N, Y_N)$ may be the historical data. The NCGI training may be performed by using the historical data. Because the historical data is related to the PDCCH AL adaptive algorithm, the output Y may be predicted by the new input data X. For example, the probability of outputting AL is expressed as a probability function $Y=P(Y|X)$, and the probability function simulates the PDCCH AL adaptive algorithm. As an example, a random forest algorithm may be used in the training process, but the disclosure is not limited thereto, and other algorithms are all feasible.

As an example, when the similarity between the trained AI model and the known AI model reaches a predetermined degree, the NCGI corresponding to the trained AI model is added to the NCGI list corresponding to the known AI model.

As an example, the AI model merging condition may include at least one of: (a) the similarity of the outputs of the plurality of AI models exceeds the threshold; (b) the coincidence degree of the NCGI lists, for example the degree of repetition of the NGCIs in the NCGI list corresponding to the plurality of AI models, exceeds the threshold; or (c) the similarity of the terminal data corresponding to the NCGI exceeds the threshold.

According to exemplary embodiments of the present disclosure, the plurality of base stations may adopt the same network equipment and the same software version, so the series of NCGIs corresponding to the plurality of base stations may correspond to one AI model. So, the plurality of base stations can share the one AI model.

As an example, the server or the terminal 120 may use the terminal data corresponding to the plurality of base stations for the training of the AI model. The AI model may still be expressed as the probability function: $Y=P(Y|X)$.

As an example, the server or the terminal 120 may integrate respective AI models by training the AI models corresponding to each base station by using terminal data corresponding to the each base station 110. To integrate respective AI models, the server or terminal 120 may use an averaging method, for example finally outputting an average value of the outputs of AI models, or a voting algorithm, for example a relative majority voting method, an absolute majority voting method, and a weighted majority voting method.

As an example, when the trained AI model and the known AI model are not the same, the trained AI model and the NCGI corresponding to the trained AI model may be added to the mapping table.

As an example, when the base stations to which the plurality of terminals belong use the same PDCCH AL adaptive algorithm, the plurality of terminals may use the same AI model. Also, the data of the plurality of terminals may be used for training together during the training, such that the speed of collecting the training data is faster, the data coverage is wider, and the trained AI model is more accurate.

Figure 15:
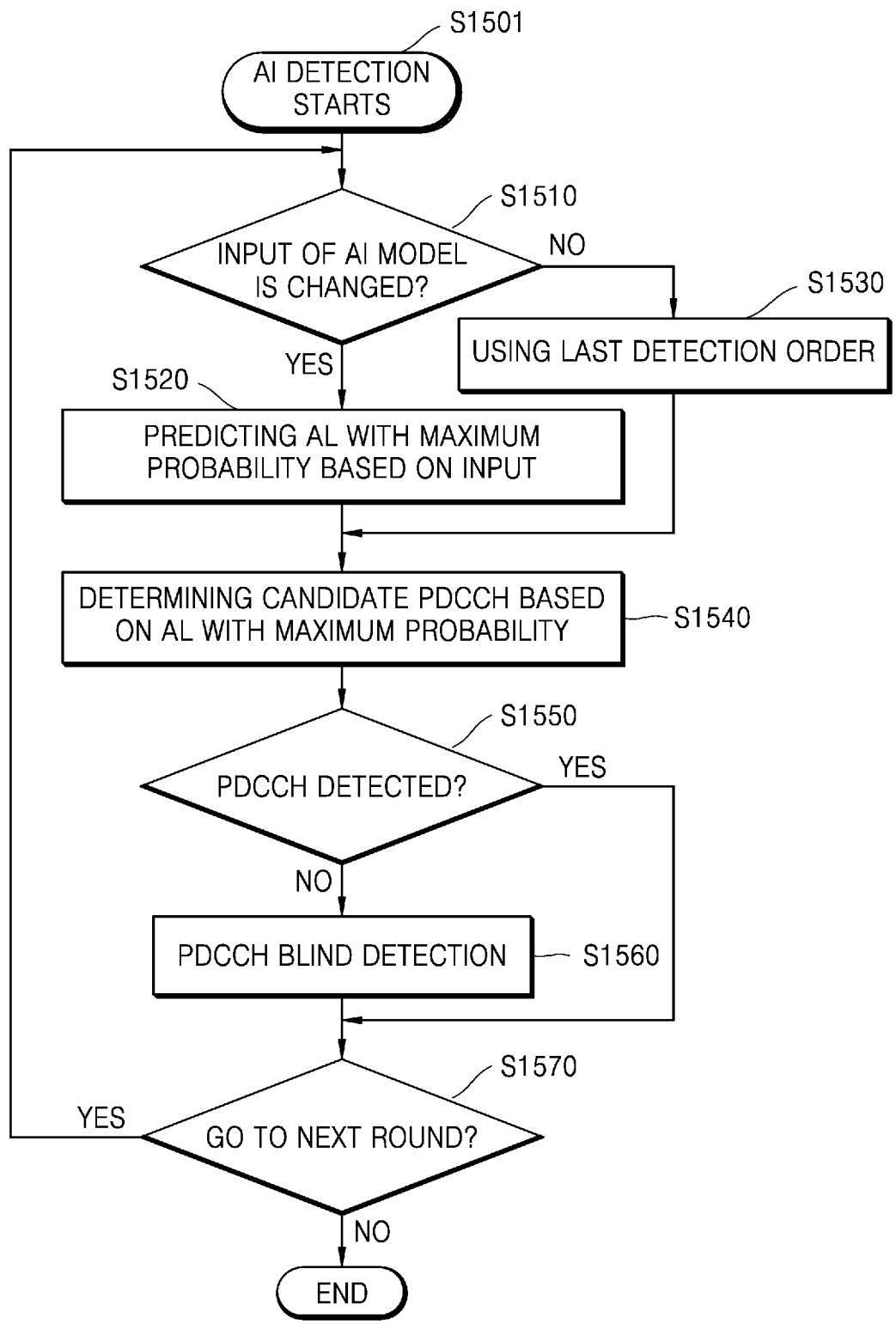
FIG. 15 illustrates a flowchart of the AI detection according to an embodiment.

If the multi-NCGI trained AI model is used, when the terminal performs network switching between the base stations running the same algorithm, the terminal only needs to use one trained AI model without switching. FIG. 15 illustrates a flowchart of the AI detection according to an exemplary embodiment of the present disclosure.

According to the exemplary embodiment of the present disclosure, at step 1501 the terminal 120 has found and obtained the AI model of the network currently registered by the terminal 120 through the NCGI.

At step S1510, the terminal 120 may detect whether the input data of the AI model changes compared with the previous input data.

At step S1520, if the input data is changed, the terminal 120 may predict the AL with the maximum probability based on the input. For example, the AI model is used to predict the most-likely AL, for example the AL with the maximum probability.

At step S1530, if the input data does not change, the previously predicted AL is used, for example the PDCCH detection is performed by using the previous detection order at step S1540.

At step S1540, the terminal 120 may determine candidate PDCCH based on AL with maximum probability. In the case where the input data is changed, the PDCCH detection may be performed based on the predicted most-likely AL.

At step S1550, the terminal 120 may determine whether the PDCCH is detected.

At step S1560, if the detection fails, for example the PDCCH is not detected, the PDCCH blind detection is performed.

At step S1570, if the detection is successful, for example the PDCCH is detected, the terminal 120 may determine whether to enter the next round of detection, and if so, a new round of PDCCH detection is entered.

As an example, if a success rate of the PDCCH detection based on the most-likely AL is about 80%, then 80% or more PDCCH blind detection may be reduced by using the AI model. At the same time, the AI model may only predict the most-likely AL without predicting all the ALs, such an AI model may be referred to as a simplified AI model. Such the AI model gives up the probability prediction of the ALs other than the most-likely AL, which has lower requirements on the computing capability and the storage space, can be applied to an Internet of Things (TOT) device with weak computing capability such as smart watches, bracelets and the like, and may have a higher universality.

According to the exemplary embodiment of the present disclosure, the training of the AI model may be performed by associated terminal 120 and AI server, alternatively. When the associated terminal 120 and AI server jointly train the AI model, the terminal 120 may first download an universal version or basic version of AI model suitable for the current specific base station 110 from the AI server. Also, the terminal 120 may continuously accumulate corresponding terminal data during use; after the accumulated data exceeds a certain threshold, the terminal may re-train the AI model based on the downloaded AI model and the collected local data; a new AI model obtained by training may be uploaded to the AI server, and after the AI model received by the AI server exceeds a certain threshold, the server may perform the training again based on the collected AI model to obtain the latest AI model.

Figure 16:
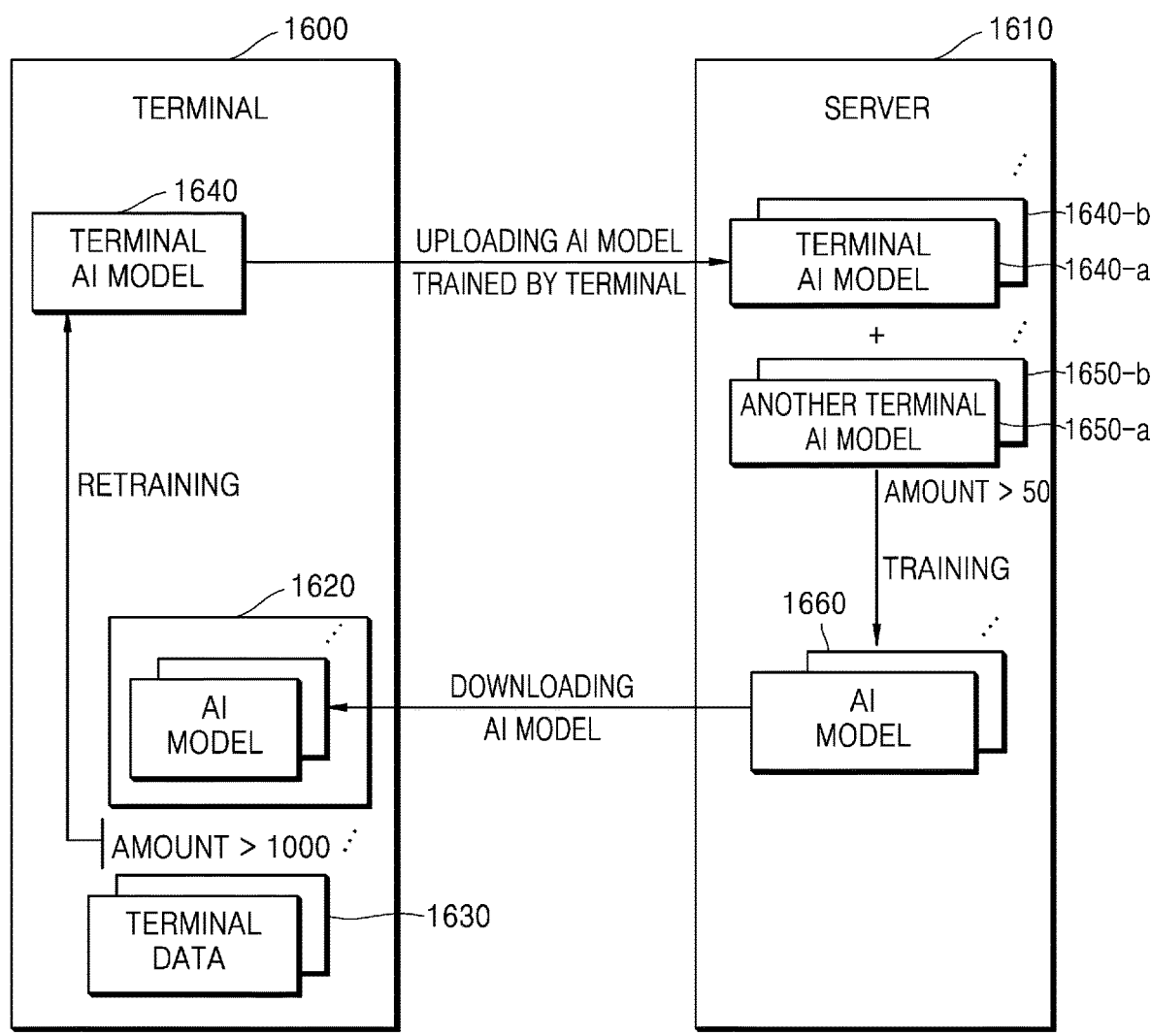
FIG. 16 illustrates a method of a joint training process of the terminal and the server according to an embodiment.

FIG. 16 illustrates a method of a joint training process of the terminal 1600 and the server 1610 according to an exemplary embodiment of the present disclosure.

According to exemplary embodiments of the present disclosure, the terminal 1600 may obtain the AI model 1620 of the network currently registered by the terminal 1600 using the identification of the cell. The terminal 1600 may download the universal version or basic version of AI model 1620 from the server 1610 based on the identification of the cell of the currently registered network. The universal version or basic version of AI model 1620 may be shared by users, and the universal version or basic version of AI model 1620 may be trained based on the historical data of the PDCCH detection corresponding to one or a series of cells (which may be determined by the cell identification such as the NCGI and the like). Due to the impact of the coverage area of the data or AI model 1620, the universal version or basic version of AI model 1620 may not perform the prediction work well, and thus retraining is needed.

As an example, after the terminal data 1630 accumulated by the terminal 1600 exceeds a certain threshold, for example more than 1000 pieces of data, the terminal 1600 may perform the retraining of the AI model 1620 based on the downloaded AI model 1620 and the collected terminal data 1630.

The terminal 1600 may retrain the downloaded AI model 1620 based on the downloaded universal version or basic version of the AI model by using the locally collected personalized terminal data 1630. That is, the training may be divided into two parts. Firstly, the training AI model 1620 may be performed by the server 1610 to obtain the universal version or basic version of AI model 1620. Secondly, the retraining for AI model 1620 may be performed by the terminal 1600 by using the locally collected terminal data 1630, so that the AI model 1620 more suitable for a user's daily use scene may be obtained. In contrast, according to traditional AI trainings, the terminal only collects the data and uploads the data to the server and the server only trains the model to be uniform.

According to the present disclosure, the terminal 1600 may selectively upload the trained terminal AI model 1640 to the server 1610.

The server 1610 may receive the terminal AI model 1640 from the terminal 1600 and another terminal AI model 1650 from another terminal. For example, the server 1610 may receive the terminal AI model 1640-*a* for the terminal 1600 at first, and then the server 1610 may receive the terminal AI model 1640-*b* for the terminal 1600. After the server 1610 may receive the terminal AI models (e.g., 1640-*a*, 1640-*b*, . . . , 1650-*a*, 1650-*b*, . . . ) corresponding to the specific NCGI exceed a certain threshold, for example more than 50 AI models, the server 1610 may perform training again based on the collected terminal AI models, to obtain the latest AI model 1660.

If the user agrees to upload the terminal AI model 1640 trained by the terminal 1600 to the server 1610, the server 1610 can collect a lot of AI models obtained by retraining using the personalized data of the user's resident base station. These terminal AI models contain the personalized data of the user's resident base station, and if the server 1610 performs an iterative training of the AI model based on the terminal AI model sets trained by all terminals, the server-side AI model 1660 will also be able to obtain the benefits of these personalized data. The prediction accuracy of the AI model 1660 at the server side is higher.

Because the joint training is used, the corresponding input may be changed from the terminal data to the AI model uploaded by the terminal 1600. The server1610 may perform the iterative training of the AI models on the network side based on the terminal AI model trained by the terminal 1600, thereby continuously improving the prediction accuracy of the AI model. The terminal 1600 may perform the local training and upload the trained terminal AI model without uploading the user data to the server 1610, which may reduce the leakage of user privacy and reduce operating costs for protecting the user privacy. Since the AI model trained by local data implies the user's personalized data, it can better provide personalized service for the user. In addition, only uploading the AI model instead of the original user data may reduce the amount of the uploaded data and reduce the consumption of resources and costs. The joint training of the terminal 1600 and the server 1610 may be implemented by using a federated learning.

In order to verify the actual effects of the exemplary embodiment of the present disclosure, the AI model is obtained based on a random forest algorithm. The AI model based on the random forest may be trained through the terminal data in an external field, and the AI model may be tested using the terminal data in another external field. The test results show that the prediction accuracy of the results determined by using the AI model exceeds 80%.

For the AI model, one training and multiple predictions may be performed; and on the other hand, the model training may be implemented by the server rather than the terminal, and the computational complexity of the terminal may be negligible.

The use of the PDCCH intelligent detection may consider that the added operation is the process of using the AI model, for example the prediction based on the AI model. The complexity during use of the AI model obtained by using the random forest training may be proportional to the product of K and P, wherein K represents the number of trees and P represents the depth of the trees. The complexity may be almost negligible compared to the complexity of channel decoding.

Assuming that in the PDCCH configuration, the probabilities of occurrence of five kinds of ALs (AL=1, AL=2, AL=4, AL=8, AL=16) are uniformly distributed, and at different AL levels, the complexity required for one candidate PDCCH detection is proportional to the PDCCH length, for example the AL of the PDCCH, the complexity of PDCCH blind detection may be about 67.6 units. Assuming that the PDCCH AI model may accurately find the AL of the PDCCH, the complexity of the PDCCH detection may be about 11.6 units, and the detection complexity of the PDCCH may be reduced by about 83%. If the AL of the PDCCH may be accurately found with the PDCCH AI model at an 80% probability, the complexity of the PDCCH detection may be approximately 22.8 units, and the detection complexity of the PDCCH may be reduced by approximately 66%.

It can be seen that the method in the present disclosure can significantly reduce the detection complexity of the PDCCH, thereby effectively reducing the power consumption during the PDCCH detection process.

At the same time, based on an interface signaling between the base station and the terminal, the base station may confirm the capability information of the terminal, and the base station configures different DRX parameters for the terminals with different capability information, which may further improve the system transmission throughput and reduce the time delay.

Figure 17:
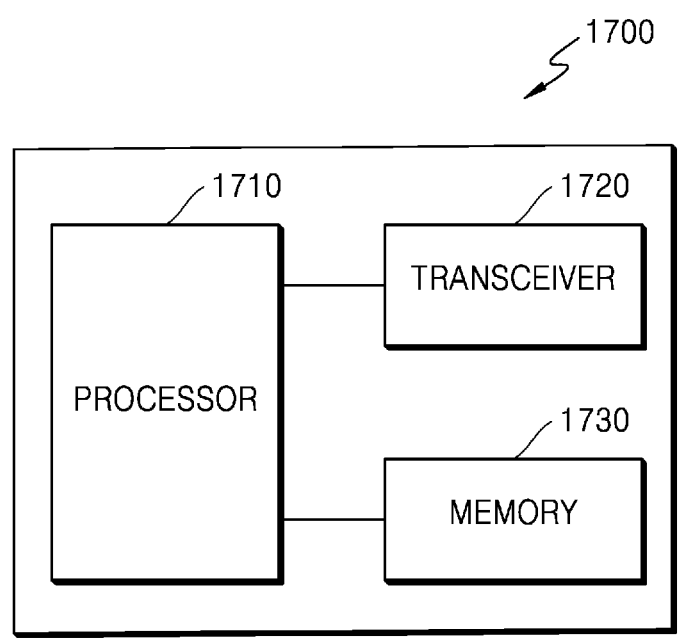
FIG. 17 schematically illustrates the base station according to an embodiment.

FIG. 17 schematically illustrates a base station according to an embodiment of the disclosure.

Referring to the FIG. 17, the base station 1700 may include a processor 1710, a transceiver 1720 and a memory 1730. However, all of the illustrated components are not essential. The base station 1700 may be implemented by more or less components than those illustrated in FIG. 17. In addition, the processor 1710 and the transceiver 1720 and the memory 1730 may be implemented as a single chip according to another embodiment.

The aforementioned components will now be described in detail.

The processor 1710 may include one or more processors or other processing devices that control the proposed function, process, and/or method. Operation of the Base station 1700 may be implemented by the processor 1710.

The transceiver 1720 may include a radio-frequency (RF) transmitter for up-converting and amplifying a transmitted signal, and an RF receiver for down-converting a frequency of a received signal. However, according to another embodiment, the transceiver 1720 may be implemented by more or less components than those illustrated in components.

The transceiver 1720 may be connected to the processor 1710 and transmit and/or receive a signal. The signal may include control information and data. In addition, the transceiver 1720 may receive the signal through a wireless channel and output the signal to the processor 1710. The transceiver 1720 may transmit a signal output from the processor 1710 through the wireless channel.

The memory 1730 may store the control information or the data included in a signal obtained by the base station 1700. The memory 1730 may be connected to the processor 1710 and store at least one instruction or a protocol or a parameter for the proposed function, process, and/or method. The memory 1730 may include read-only memory (ROM) and/or random access memory (RAM) and/or hard disk and/or compact disc (CD)-ROM and/or digital versatile disc (DVD) and/or other storage devices.

In an embodiment, the base station 110 illustrated in FIG. 1 may correspond to the base station 1700.

In an embodiment, the processor 1710 may be configured to receive, from a terminal, a reporting data for deciding an aggregation level of CCE and transmitting, to the terminal, a PDCCH based on the reporting data.

In an embodiment, the processor 1710 may be configured to receive, from the terminal, PDCCH detection capability information, wherein the PDCCH detection capability information indicates whether the terminal has detected PDCCH according to a determined detection order. The processor 1710 may be configured to determine information of a DRX cycle based on the PDCCH detection capability information, and transmit, to the terminal, the information of DRX cycle. For example, the DRX cycle of the terminal is shorter than a DRX cycle of other terminal which detects the DCI based on the predetermined detection order according to blind detection. According to another exemplary embodiment of the present disclosure, the base station 1700 may include may be configured to: configure the terminal that can perform the PDCCH detection based on the predicted AL related information with the DRX cycle shorter than the DRX cycle configured for the terminal that cannot perform the PDCCH detection based on the predicted AL related information.

In an embodiment, the processor 1710 may be configured to implement or perform the operation of the above-described units.

FIG. 18 schematically illustrates a terminal according to an embodiment of the disclosure.

Referring to FIG. 18, the terminal 1800 may include a processor 1810, a transceiver 1820 and a memory 1830. However, all of the illustrated components are not essential. The terminal 1800 may be implemented by more or less components than those illustrated in FIG. 18. In addition, the processor 1810 and the transceiver 1820 and the memory 1830 may be implemented as a single chip according to another embodiment.

The aforementioned components will now be described in detail.

The processor 1810 may include one or more processors or other processing devices that control the proposed function, process, and/or method. Operation of the terminal 1800 may be implemented by the processor 1810.

The transceiver 1820 may include an RF transmitter for up-converting and amplifying a transmitted signal, and an RF receiver for down-converting a frequency of a received signal. However, according to another embodiment, the transceiver 1820 may be implemented by more or less components than those illustrated in components.

The transceiver 1820 may be connected to the processor 1810 and transmit and/or receive a signal. The signal may include control information and data. In addition, the transceiver 1820 may receive the signal through a wireless channel and output the signal to the processor 1810. The transceiver 1820 may transmit a signal output from the processor 1810 through the wireless channel.

The memory 1830 may store the control information or the data included in a signal obtained by the terminal 1800. The memory 1830 may be connected to the processor 1810 and store at least one instruction or a protocol or a parameter for the proposed function, process, and/or method. The memory 1830 may include ROM and/or RAM and/or hard disk and/or CD-ROM and/or DVD and/or other storage devices.

In an embodiment, the terminal 120 illustrated in FIG. 1 may correspond to the terminal 1800.

In an embodiment, the processor 1810 may be configured to receive, from a base station, a PDCCH and predict an aggregation level related information including information about the aggregation level of CCE on which the PDCCH is received based on an aggregation level prediction model. For example, the aggregation level prediction model may include information for predicting the aggregation level of the PDCCH received from the base station. The processor 1810 may be configured to determine a detection order for detecting the PDCCH based on the aggregation level related information and detect the PDCCH based on the determined detection order.

In an embodiment, the processor 1810 may be configured to obtain an input data for predicting the aggregation level related information, and predict aggregation level related information by using the aggregation level prediction model based on the input data. For example, the input data may be related to a reporting data transmitted to the base station for deciding an aggregation level of CCE. For example, the input data includes at least one of RSRP, a CQI, an SNR, a DCI payload, or a PDCCH slot index.

In an embodiment, the processor 1810 may be configured to determine a probability of detecting the PDCCH for each aggregation level, and determine the detection order based on the probability for each aggregation level. For example, the detection order may be determined to first detect the CCE corresponding to the aggregation level with the largest probability value.

In an embodiment, the processor 1810 may be configured to obtain a cell identification of a cell to which the terminal is attached and identify the aggregation level prediction model that corresponds to the cell identification.

In an embodiment, the processor 1810 may be configured to determine a prediction accuracy of the aggregation level prediction model, and predict the aggregation level related information based on the aggregation level prediction model, when the prediction accuracy is equal to or greater than a preset value.

In an embodiment, the processor 1810 may be configured to obtain the aggregation level prediction model from the server, and update the aggregation level prediction model based on the reporting data which is transmitted to the base station for deciding an aggregation level of CCE and a result data of detecting the PDCCH.

In an embodiment, the processor 1810 may be configured to report, to the base station, PDCCH detection capability information. For example, the PDCCH detection capability information may indicate whether the terminal has detected PDCCH according to the determined detection order. The processor 1810 may be configured to receive, from the base station, information of a DRX cycle which is determined based on the PDCCH detection capability information, and detect the PDCCH according to the information of the DRX cycle. For example, the DRX cycle of the terminal may be shorter than a DRX cycle of another terminal which detects the DCI based on the predetermined detection order according to blind detection. For example, the PDCCH detection capability information may be transmitted by an RRC signaling.

According to another exemplary embodiment of the present disclosure, the terminal 1800 according to the exemplary embodiment of the present disclosure may include a data obtaining unit, a prediction unit and a detection unit. As an example, the data obtaining unit may be configured to obtain input data needed to predict the AL related information. As an example, the prediction unit may be configured to predict the AL related information by using the AL prediction model based on the obtained input data. As an example, the detection unit may be configured to perform the PDCCH detection based on the predicted AL related information. As an example, the input data needed to predict the AL related information may include link information. As an example, the AL related information may include at least one of a detect order with respect to a plurality of ALs, a probability of each of the plurality of ALs, or an AL with the maximum probability in the plurality of ALs. As an example, the link information may include at least one of the RSRP, the CQI, the SNR, the DCI payload, or the PDCCH slot index.

As an example, the detection unit may be configured to: if the AL related information includes the AL with the maximum probability in the plurality of ALs, perform the PDCCH detection based on the predicted AL with the maximum probability; and if the detection fails, perform the PDCCH blind detection based on another AL. As an example, the detection unit may be configured to determine the PDCCH detection order based on the predicted AL related information and perform the PDCCH detection based on the determined PDCCH detection order.

As an example, the prediction unit may be configured to find the AL prediction model corresponding to the cell to which the terminal is attached according to a cell identification of the cell to which the terminal is attached and a correspondence relationship between the AL prediction model and the cell identification; and predict the AL related information by using the found AL prediction model based on the obtained input data. As an example, the cell identification may include the NCGI, the NCGI including at least one of the MCC, the MNC, and the gNB identification. As an example, the terminal 1800 may further include a judging unit. As an example, the judging unit may be configured to determine that, before predicting the AL related information by using the found AL prediction model, the found AL prediction model is valid based on a prediction accuracy of the found AL prediction model. As an example, the prediction unit may be configured to find the AL prediction model corresponding to the cell to which the terminal is attached from the terminal locally or the server. As an example, the terminal may further include a merging unit. As an example, the merging unit may be configured to determine whether to merge at least two AL prediction models according to at least one of: information indicating performing an AL prediction model merging, the similarity between outputs of the at least two AL prediction models, the coincidence degree of cell identification lists, and the similarity between inputs of the at least two AL prediction models; and amending the correspondence relationship between the AL prediction model and the cell identification, so that respective cell identifications corresponding to the merged AL prediction models correspond to the same AL prediction model.

As an example, the terminal 1800 may further include a training unit and a model obtaining unit. The model obtaining unit may be configured to obtain the constructed AL prediction model from the terminal locally or the server. The training unit may be configured to train the obtained AL prediction model based on historical data of the terminal. For example, the historical data of the terminal may include the input data reported to the base station by the terminal, and AL related information of the PDCCH that has been detected by the terminal.

As an example, the terminal 1800 may further include a reporting unit. The reporting unit may be configured to report PDCCH detection capability information to the base station. For example, the PDCCH detection capability information may be capable of indicating whether the terminal can perform the PDCCH detection based on the predicted AL related information.

As an example, the terminal 1800 further may include a receiving unit. The receiving unit may be configured to obtain the DRX cycle configured by the base station. For example, the DRX cycle may be configured by the base station according to the PDCCH detection capability information reported by the terminal. the base station may configure the terminal that can perform the PDCCH detection based on the predicted AL related information with the DRX cycle shorter than the DRX cycle configured for the terminal that cannot perform the PDCCH detection based on the predicted AL related information. The detection unit is configured to perform the PDCCH detection based on the predicted AL related information and the obtained DRX cycle.

As an example, the reporting unit may be configured to report the capability information through the information element (IE).

As an example, the prediction unit may be configured to judge whether the currently obtained input data needed to predict the AL related information changes in comparison with historical input data. Also, the prediction unit may be configured to predict the AL related information by using the AL prediction model when it is judged that a change occurs.

The detection unit may be configured to perform the PDCCH detection by using the AL related information predicted based on the historical input data when it is judged that no change occurs.

In an embodiment, the processor 1810 may be configured to implement or perform the operation of the above-described units, or the processor 1810 may be embodied as various numbers of hardware, software and/or firmware structures such as a central processing unit (CPU) or a microprocessor, or the like that control the above-described units to implement or perform operations described above.

Figure 19:
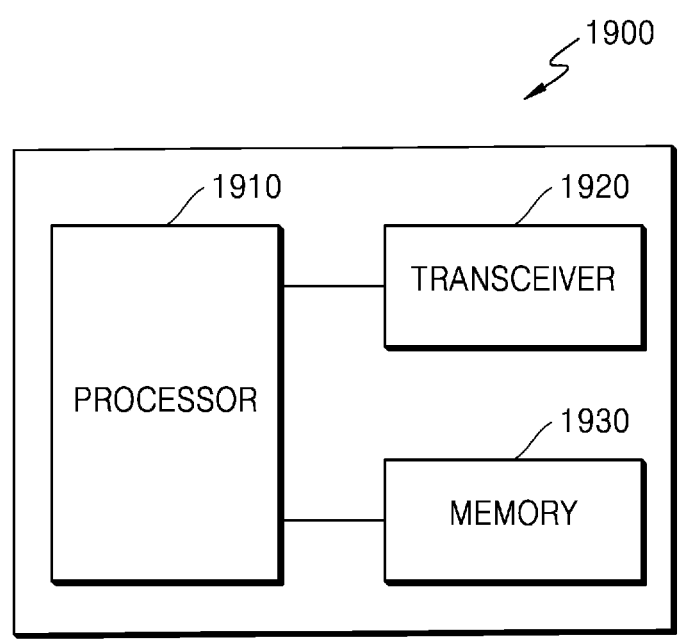
FIG. 19 schematically illustrates a server according to an embodiment.

FIG. 19 schematically illustrates a server according to an embodiment of the disclosure.

Referring to the FIG. 19, the server 1900 may include a processor 1910, a transceiver 1920 and a memory 1930. However, all of the illustrated components are not essential. The server 1900 may be implemented by more or less components than those illustrated in FIG. 19. In addition, the processor 1910 and the transceiver 1920 and the memory 1930 may be implemented as a single chip according to another embodiment.

The aforementioned components will now be described in detail.

The processor 1910 may include one or more processors or other processing devices that control the proposed function, process, and/or method. Operation of the server 1900 may be implemented by the processor 1910.

The transceiver 1920 may include an RF transmitter for up-converting and amplifying a transmitted signal, and an RF receiver for down-converting a frequency of a received signal. However, according to another embodiment, the transceiver 1920 may be implemented by more or less components than those illustrated in components.

The transceiver 1920 may be connected to the processor 1910 and transmit and/or receive a signal. The signal may include control information and data. In addition, the transceiver 1920 may receive the signal through a wireless channel and output the signal to the processor 1910. The transceiver 1920 may transmit a signal output from the processor 1910 through the wireless channel.

The memory 1930 may store the control information or the data included in a signal obtained by the server 1900. The memory 1930 may be connected to the processor 1910 and store at least one instruction or a protocol or a parameter for the proposed function, process, and/or method. The memory 1830 may include ROM and/or RAM and/or hard disk and/or CD-ROM and/or DVD and/or other storage devices.

According to another exemplary embodiment of the present disclosure, the server 1900 may include: a receiving unit configured to receive related data of the PDCCH detection reported by the terminal; a training unit configured to train the AL prediction model based on the related data of the PDCCH detection reported by the terminal; and a transmission unit configured to transmit the trained AL prediction model to the terminal.

As an example, the related data of the PDCCH detection reported by the terminal includes link information between the terminal and the base station, and AL information of the PDCCH that has been detected by the terminal, wherein the training unit is configured to: train one AL prediction model based on the reported related data of the PDCCH detection corresponding to a plurality of base stations of the same type, and/or, respectively perform the training of the AL prediction model with respect to respective base stations, and/or, train one AL prediction model with respect to all the base stations.

In an embodiment, the processor 1910 may be configured to implement or perform the operation of the above-described units, or the processor 1910 may be embodied as various numbers of hardware, software and/or firmware structures such as a CPU or a microprocessor, or the like that control the above-described units to implement or perform operations described above.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

According to another exemplary embodiment of the present disclosure, a non-transitory computer-readable storage medium storing an instruction is provided, wherein, when the instruction is executed by at least one computing device, the at least one computing device is made to perform the above detection method and/or configuration method.

Embodiments according to the concept of the present disclosure have been described above, the features in respective embodiments may be combined without departing from the protection scope of the present disclosure, and these combinations may also fall within the protection scope of the present disclosure.

The non-transitory computer-readable storage medium may be any data storage device that can store data which may be read out by a computer system. Examples of the computer-readable storage medium may include: a read-only memory, a random access memory, a CD-ROM, a storage tape, a floppy disk, an optical data storage device and a carrier (such as data transmission over the Internet via a wired or wireless transmission path).

In addition, it is to be appreciated that respective units of the terminal and base station according to the exemplary embodiments of the present disclosure may be implemented as hardware components and/or software components. According to the processing performed by the defined respective units, those skilled in the art may implement the respective units using, for example, a Field Programmable Gate Array (FPGA) or an Application Specific Integrated Circuit (ASIC).

In addition, the methods according to the exemplary embodiments of the present disclosure may be implemented as computer codes in the computer-readable storage medium. Those skilled in the art may implement the computer codes according to the description for the above methods. When the computer codes are performed in a computer, the above method of the present disclosure is implemented.

Although some exemplary embodiments have been displayed and described, it will be understood by those skilled in the art that the amendments may be made to these embodiments without departing from the principle and spirit of the present disclosure, and the scope of the present disclosure is defined in the claims and the equivalents thereof

What is claimed is:

1. A method performed by a terminal in a wireless communication system, the method comprising:

determining a prediction accuracy of an aggregation level prediction model;

identifying whether the aggregation level prediction model is valid based on the prediction accuracy of the aggregation level prediction model and a preset value, wherein the aggregation level prediction model is identified as being valid based on the prediction accuracy being equal to or greater than the preset value;

predicting aggregation level information based on the aggregation level prediction model based on the aggregation level prediction model being identified as being valid, wherein the aggregation level information includes information about an aggregation level of a control channel element (CCE) related to a physical downlink control channel (PDCCH);

determining a detection order for detecting the PDCCH based on the aggregation level information; and detecting the PDCCH based on the determined detection order.

2. The method of claim 1, further comprising:

obtaining input data for predicting the aggregation level information; and predicting the aggregation level information based on the aggregation level prediction model and the input data;

wherein the input data is related to reporting data transmitted to a base station for determining the aggregation level of the CCE.

3. The method of claim 2, wherein the input data includes at least one of a reference signal receiving power (RSRP), a channel quality indicator (CQI), a signal-to-noise ratio (SNR), a downlink control information (DCI) payload, or a PDCCH slot index.

4. The method of claim 1, wherein the predicting of the aggregation level information based on the aggregation level prediction model comprises determining a probability of detecting the PDCCH for each one of a plurality of aggregation levels; and wherein the determining of the detection order for detecting PDCCH based on the aggregation level information comprises determining the detection order based on the probability for the each one of the plurality of aggregation levels.

5. The method of claim 4, wherein the detection order is determined to first detect a CCE corresponding to an aggregation level having a largest probability value from among the plurality of aggregation levels.

6. The method of claim 1, further comprising:

obtaining a cell identifier of a cell to which the terminal is connected; and identifying the aggregation level prediction model based on the cell identifier.

7. The method of claim 6, wherein the cell identifier includes a new radio cell global identity (NCGI), and wherein the NCGI includes at least one of a mobile country code (MCC), a mobile network code (MNC), or a next generation node (gNB) identification.

8. The method of claim 1, further comprising:

obtaining the aggregation level prediction model from the server; and updating the aggregation level prediction model based on reporting data which is transmitted to a base station for deciding the aggregation level of the CCE, and result data corresponding to the detecting of the PDCCH.

9. The method of claim 1, further comprising:
reporting, to a base station, PDCCH detection capability information indicating whether the terminal has detected the PDCCH according to the determined detection order;
receiving, from the base station, information about a discontinuous reception (DRX) cycle which is determined based on the PDCCH detection capability information; and
detecting the PDCCH according to the information about the DRX cycle.

10. The method of claim 9,
wherein the DRX cycle of the terminal is shorter than a DRX cycle of another terminal which detects the PDCCH based on blind detection.

11. The method of claim 9, wherein the PDCCH detection capability information is transmitted using a radio resource control (RRC) signaling.

12. A terminal of a wireless communication system, the terminal comprising:
a transceiver; and
at least one processor coupled with the transceiver and configured to:
determine a prediction accuracy of an aggregation level prediction model,
identify whether the aggregation level prediction model is valid based on the prediction accuracy of the aggregation level prediction model and a preset value, wherein the aggregation level prediction model is identified as being valid based on the prediction accuracy being equal to or greater than the preset value;
predict aggregation level information based on the aggregation level prediction model based on the aggregation level prediction model being identified as being valid, wherein the aggregation level information includes information about an aggregation level of a control channel element (CCE) related to a physical downlink control channel (PDCCH),
determine a detection order for detecting the PDCCH based on the aggregation level information, and
detect the PDCCH based on the determined detection order.

13. The terminal of claim 12, wherein the at least one processor is further configured to:
obtain input data for predicting the aggregation level information, and
predict the aggregation level information based on the aggregation level prediction model and the input data,
wherein the input data is related to a reporting data transmitted to a base station for determining the aggregation level of the CCE.

14. The terminal of claim 12, wherein the at least one processor is further configured to:
determine a probability of detecting the PDCCH for each one of a plurality of aggregation levels, and
determine the detection order based on the probability for the each one of the plurality of aggregation levels.

15. The terminal of claim 12, wherein the at least one processor is further configured to:
obtain a cell identifier of a cell to which the terminal is connected; and
identify the aggregation level prediction model based on the cell identifier.

16. The terminal of claim 12, wherein the at least one processor is further configured to:
report, to a base station, PDCCH detection capability information indicating whether the terminal has detected the PDCCH according to the determined detection order;
receive, from the base station, information about a discontinuous reception (DRX) cycle which is determined based on the PDCCH detection capability information; and
detect the PDCCH according to the information about the DRX cycle.

* * * * *